US 12,020,577 B2
United States Patent
Ando et al.

(10) Patent No.: US 12,020,577 B2
(45) Date of Patent: Jun. 25, 2024

(54) SHIP MANEUVERING CALCULATION DEVICE

(71) Applicants: NIPPON YUSEN KABUSHIKI KAISHA, Tokyo (JP); JAPAN MARINE SCIENCE INC., Kanagawa (JP)

(72) Inventors: Hideyuki Ando, Tokyo (JP); Koji Kutsuna, Tokyo (JP); Satoru Kuwahara, Kanagawa (JP)

(73) Assignees: NIPPON YUSEN KABUSHIKI KAISHA, Tokyo (JP); JAPAN MARINE SCIENCE INC., Kanagawa (JP)

( * ) Notice: Subject to any disclaimer, the term of this patent is extended or adjusted under 35 U.S.C. 154(b) by 60 days.

(21) Appl. No.: 17/924,482

(22) PCT Filed: May 26, 2020

(86) PCT No.: PCT/JP2020/020675
§ 371 (c)(1),
(2) Date: Nov. 10, 2022

(87) PCT Pub. No.: WO2021/229825
PCT Pub. Date: Nov. 18, 2021

(65) Prior Publication Data
US 2023/0186774 A1  Jun. 15, 2023

(30) Foreign Application Priority Data
May 11, 2020 (JP) .................................. 2020-083259

(51) Int. Cl.
G08G 3/02 (2006.01)
B63B 49/00 (2006.01)
B63H 25/04 (2006.01)

(52) U.S. Cl.
CPC .............. *G08G 3/02* (2013.01); *B63B 49/00* (2013.01); *B63H 25/04* (2013.01)

(58) Field of Classification Search
CPC ........... G08G 3/02; B63B 49/00; B63H 25/04
See application file for complete search history.

(56) References Cited

U.S. PATENT DOCUMENTS 5,515,287 A     5/1996  Hakoyama
5,969,665 A  *  10/1999 Yufa ...................... G08G 1/166
                                                               342/41

(Continued)

FOREIGN PATENT DOCUMENTS

JP    H0922499    *  7/1995  ............. B63B 43/18
JP    H09-22500 A     1/1997

(Continued)

OTHER PUBLICATIONS

World Intellectual Property Organization, International Search Report for International Application No. PCT/JP2020/020675, 4 total pages Jan. 9, 2020.

(Continued)

*Primary Examiner* — Hongmin Fan
(74) *Attorney, Agent, or Firm* — SoCal IP Law Group LLP; Mark Andrew Goldstein

(57) ABSTRACT

A technique capable of determining a suitable or optimum exclusive region (bumper) setting value and improving the accuracy and others of ship collision avoidance support and automatic ship maneuvering as a result is provided. A ship maneuvering calculation device 1 calculates setting information of an automatic ship collision avoidance program 3 for achieving a function of an automatic ship collision avoidance device 2 of a vessel. The ship maneuvering calculation device 1 generates a plurality of exclusive region values 103 that are different in at least a shape and a size as parameter values for an exclusive region set around a vessel, repeatedly executes simulation calculation using the automatic ship collision avoidance program (a copy 13) while changing a condition 102 and the parameter values, calculates an evaluation value 105 corresponding to the parameter value, based on the result of the simulation calculation, determines an optimum value 106 of the exclusive region, based on the evaluation value, and sets the optimum value 106 of the exclusive region to the automatic ship collision avoidance program 3.

9 Claims, 13 Drawing Sheets

(56) References Cited

U.S. PATENT DOCUMENTS

2016/0125739 A1  5/2016 Stewart
2020/0105143 A1* 4/2020 Ramstrum, Jr. ... G01C 21/3807

FOREIGN PATENT DOCUMENTS

| JP | 2020027344 | * | 8/2018 |
| JP | 2021018484 | * | 7/2019 |
| JP | 2020027343 | A | 2/2020 |
| JP | 2020027344 | A | 2/2020 |
| WO | 2021229825 | A1 | 11/2021 |

OTHER PUBLICATIONS

Finnish Patent and Registration Office, First Opinion on Patentability for Application No. 20226010, mail date Jun. 2, 2023. 8 pages.

* cited by examiner

FIG. 10
SHAPE
(A) ELLIPSE
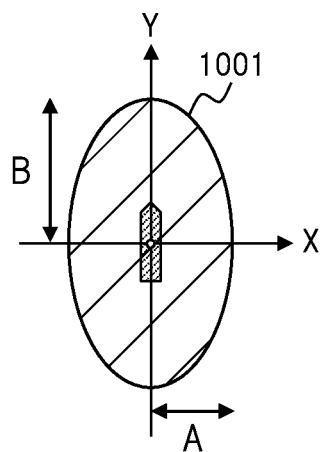
(B) RECTANGLE
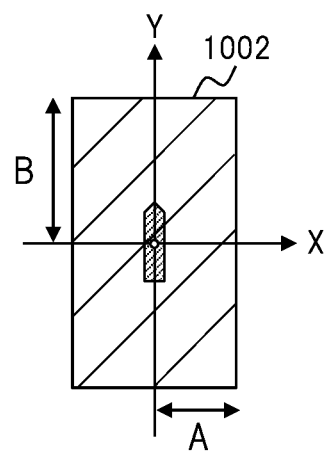
(C) VESSEL EXTERNAL SHAPE EXTENDED FIGURE
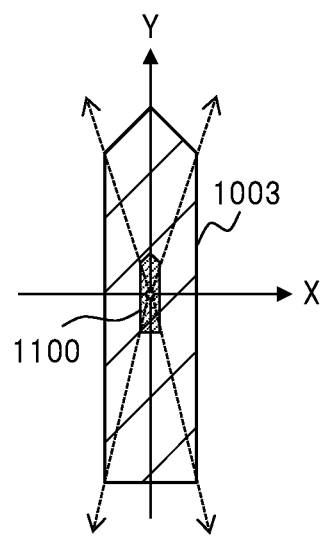
(D) POLYGON
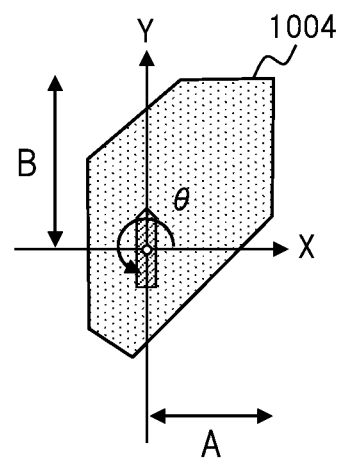

DEVIATION

FIG. 14
(A)
IN BAY: CONGESTION LEVEL IS HIGH
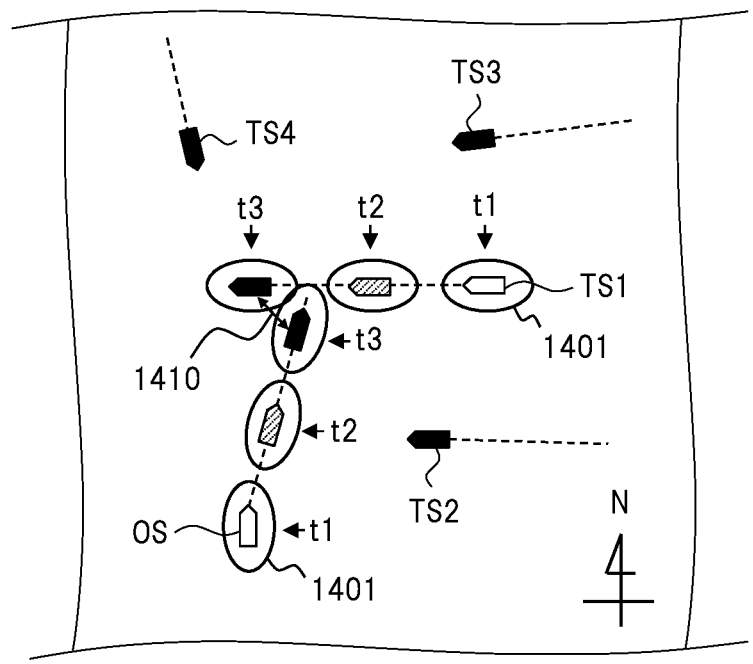
(B)
IN FAR SEA: CONGESTION LEVEL IS LOW
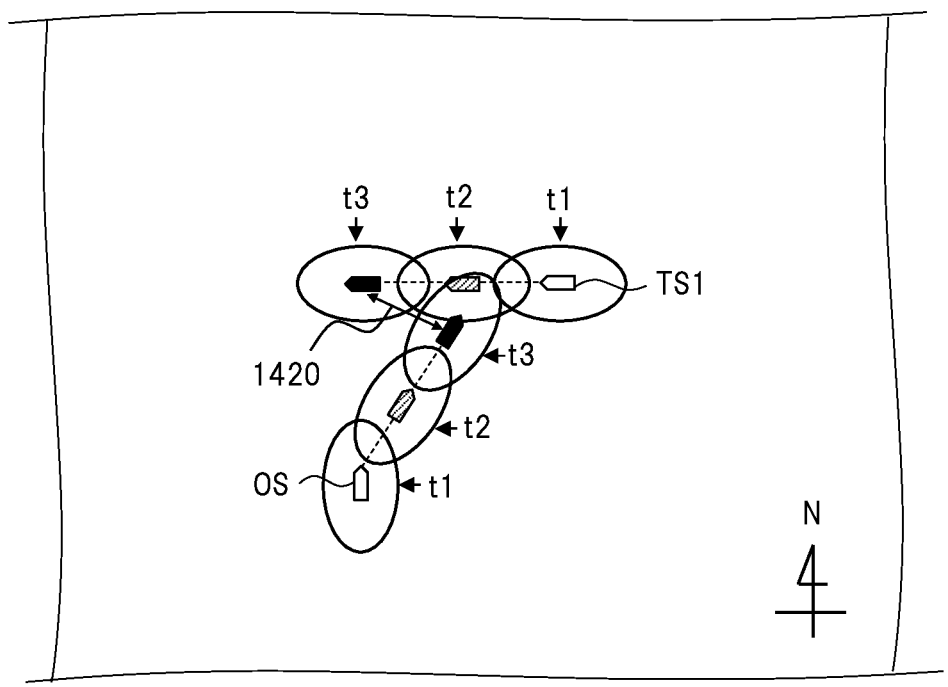

SHIP MANEUVERING CALCULATION DEVICE

RELATED APPLICATION INFORMATION

This patent claims priority from International PCT Patent Application No. PCT/JP2020/020675, filed May 26, 2020 entitled, "SHIP MANEUVERING CALCULATION DEVICE", which claims priority to Japanese Patent Application No. 2020-083259, filed May 11, 2020 all of which are incorporated herein by reference in their entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

TECHNICAL FIELD

The present invention relates to a technique of ship maneuvering calculation for ship collision avoidance support and automatic ship maneuvering and others.

BACKGROUND ART

As one of safety standards and parameters for ship maneuvering on the sea, there is an exclusive region (which may be referred to as a bumper) set around a ship. The exclusive region is referred to when the risk of collision between an own ship and an other ship is calculated. A model including the exclusive region is a necessary element for achieving safe and efficient ship maneuvering.

Japanese Patent Application Laid-open Publication No. 2020-27343 (Patent Document 1) is cited as an example of the related art related to the ship collision avoidance support. The Patent Document 1 describes a "ship collision avoidance support device" that enables realistic ship collision avoidance maneuvering in accordance with a congestion situation in a sea area. The Patent Document 1 describes that a risk level calculation unit calculates a collision risk level with respect to an other ship when an own ship performs ship collision avoidance maneuvering by using an elliptical bumper region set around a reference vessel which is one of the own ship and the other ship, describes that a blocking coefficient calculation unit calculates a blocking coefficient indicating how much the own ship's option of the ship collision avoidance maneuvering is blocked by a relation with the other ship, and describes that a bumper size setting unit variably sets a size of the bumper region used by the risk level calculation unit in accordance with the blocking coefficient calculated by the blocking coefficient calculation unit.

For example, as described in the Patent Document 1, in a ship collision avoidance maneuvering program of the ship collision avoidance support device, a utility value of a ship collision avoidance maneuvering space is determined by a preference level and a collision risk level. The ship collision avoidance maneuvering space is a space made of combination of a course altering angle and a speed altering rate, and the utility value is calculated for each position of this space. For example, the utility value is obtained by subtracting an objective collision risk level with respect to other ships in accordance with altering of the course or the speed from a subjective preference level of a ship operator associated with the altering of the course or the speed.

RELATED ART DOCUMENT

Patent Document

Patent Document 1: Japanese Patent Application Laid-open Publication No. 2020-27343.

SUMMARY OF THE INVENTION

Problems to be Solved by the Invention

In the related art, an exclusive region (bumper) is determined to have, for example, an elliptical shape around a vessel, and its size is determined based on total lengths, speed, and others of the own ship and the other ship. In particular, the Patent Document 1 describes that, for example, actual ship collision avoidance maneuvering is enabled in consideration of a congestion situation in a sea area such as a far sea, a near sea, or a bay, and specifically describes that the size of the bumper is changed in accordance with the blocking coefficient.

In the related-art ship collision avoidance support device, the parameter setting value of the bumper, which is the core of the ship collision avoidance action of the ship collision avoidance maneuvering program, is determined by a person appropriately adjusting the parameter setting value based on the ship maneuvering sense or others. A case of a certain bumper setting value determined as described above has a probability not causing a suitable or optimum bumper shape and size that meets various conditions such as a ship model and a congestion level. In other words, in the related-art technique, a suitable or optimum bumper setting value is not sufficiently examined. In the related-art technique, for example, the suitable or optimum bumper setting value is not quantitatively verified. Therefore, there is room for improvement in the accuracy of the ship collision avoidance support and the automatic ship maneuvering and others.

An object of the present invention relates to a technique of a ship maneuvering calculation for ship collision avoidance support and automatic ship maneuvering and others, and is to provide a technique capable of determining a suitable or optimum bumper setting value, which results in increase of the accuracy of the ship collision avoidance support and the automatic ship maneuvering and others.

Means for Solving the Problems

A typical embodiment of the present invention has the following configuration. A ship maneuvering calculation device of an embodiment is a ship maneuvering calculation device for calculating setting information of an automatic ship collision avoidance program for achieving a ship collision avoidance support function of a vessel, generates a plurality of exclusive region values that are different in at least a shape and a size as parameter values for an exclusive region set around a vessel, repeatedly executes simulation calculation using the automatic ship collision avoidance program while changing the parameter values, calculates an evaluation value in accordance with the parameter values based on a result of the simulation calculation, determines an optimum value of the exclusive region based on the evaluation value, and sets the optimum value of the exclusive region into the automatic ship collision avoidance program.

Effects of the Invention

According to a typical embodiment of the present invention, regarding a technique such as ship maneuvering calculation for ship collision avoidance support and automatic ship maneuvering, the suitable bumper can be set, and the accuracy of the ship collision avoidance support and the automatic ship maneuvering and others can be increased.

BRIEF DESCRIPTIONS OF THE DRAWINGS

FIG. 10 is a diagram illustrating an example of a shape of the exclusive region in the first embodiment.

FIG. 14 is a diagram illustrating an example of a situation of a sea area in a case of usage of a congestion level in the first embodiment.

DETAILED DESCRIPTION OF PREFERRED EMBODIMENTS

Figure 1:
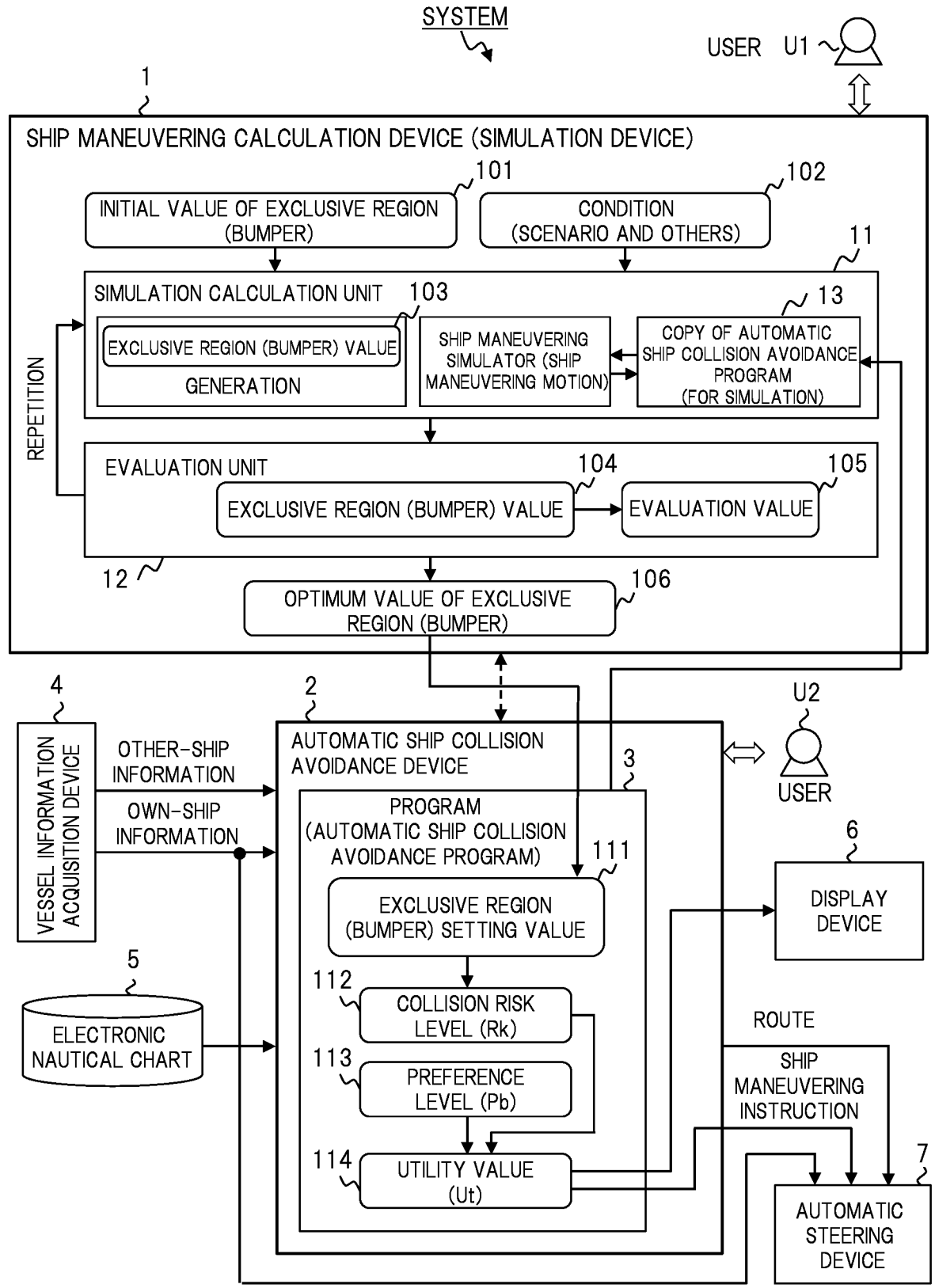
FIG. 1 is a diagram illustrating a configuration of an entire system including a ship maneuvering calculation device according to a first embodiment of the present invention.

Embodiments of the present invention will be described below in detail with reference to the drawings. Note that the same components are denoted by the same reference signs throughout all the drawings, and the repetitive description thereof will be omitted.

First Embodiment

A ship maneuvering calculation device according to a first embodiment of the present invention will be described with reference to FIGS. 1 to 16. As means for solving the problems, the present inventors have considered the following new method. In the ship maneuvering calculation device 1 according to the first embodiment illustrated in FIG. 1 and others, a suitable or optimum value is determined as a setting value of an exclusive region (bumper) in an automatic ship collision avoidance program 3 by simulation using a computer. The simulation includes a ship maneuvering simulation for simulating a physical ship maneuvering motion of a vessel and a simulation connected with the automatic ship collision avoidance program for performing ship maneuvering on behalf of a ship operator. For convenience of explanation, these simulations may be collectively referred to as a ship maneuvering simulation. The ship maneuvering calculation device 1 repeats the ship maneuvering simulation and the evaluation associated therewith for each bumper value 103 as a parameter value generated based on any bumper initial value 101. By the ship maneuvering simulation, a utility value described below or others in a copy 13 of the automatic ship collision avoidance program 3 is calculated, based on settings of a certain bumper value 103, a certain condition 102 and others. The evaluation is quantitative evaluation as to whether the bumper value 103 is suitable in accordance with the condition 102. The condition 102 includes a scenario (corresponding to a simulation scenario) in a sea area. The ship maneuvering calculation device 1 finds an optimum solution (optimum value 106) of a bumper setting value by repeating the ship maneuvering simulation and the evaluation. The bumper setting value 111 that is the optimum value 106 is set in the automatic ship collision avoidance program 3 for actual operation. When the condition 102 or others is added or changed based on verification or others, the bumper setting value 111 can be updated in accordance with further simulation.

AI (artificial intelligence) including machine learning can also be used in the ship maneuvering simulation. For example, deep learning using an image related to the situation of the sea area or others is also applicable to the ship maneuvering simulation. More specifically, shape characteristics such as the shape and the size of the bumper are used as an input parameter, the evaluation value obtained by the ship maneuvering simulation is used as an output value, a part of the parameter and the value is learned as learning data using supervised learning such as deep learning, and the rest of them is verified as test data, and, as a result, it is possible to obtain the relationship between the input parameter and the output value and the value of the accuracy in estimating the output from the input. Thus, it is possible to select an optimum machine learning method for data and to also search for the optimum solution using the learning result of the machine learning. By further developing this method, there is a possibility that relationships between more various input parameters and outputs, such as selecting an optimum bumper shape in accordance with the congestion level on a route and the ship maneuvering performance of the own ship, can be collectively handled.

[System]

FIG. 1 illustrates a configuration of an entire system including the ship maneuvering calculation device 1 according to the first embodiment. The system includes a ship maneuvering calculation device 1, an automatic ship collision avoidance device 2, a vessel information acquisition device 4, an electronic nautical chart 5, a display device 6, and an automatic steering device 7. The system roughly includes two components, one of them is the automatic ship collision avoidance device 2 including the program 3 which is the automatic ship collision avoidance program, and the other is the ship maneuvering calculation device 1 according to the first embodiment. The automatic ship collision avoidance device 2 or others is a device or a system that performs ship collision avoidance support and automatic ship maneuvering while being mounted on an actual vessel or being linked to a vessel by remote communication from land. Note that a specific example of the automatic ship collision avoidance device 2 is also described in the Patent Document 1. The ship maneuvering calculation device 1 is a device or a system having a function of determining information such as the bumper setting value 111 to be applied to the program 3 of the automatic ship collision avoidance device 2 by the simulation on the computer. The ship maneuvering calculation device 1 is, in other words, a simulation device. The ship maneuvering calculation device 1 and the automatic ship collision avoidance device 2 are communicatively connected to each other via a predetermined communication interface. A user U1 is a person who is responsible for determining the shape, size, and others of the bumper, and operates the ship maneuvering calculation device 1 to execute the simulation or others. A user U2 is a ship operator, a supervisor, or others, who uses the automatic ship collision avoidance device 2.

The ship maneuvering calculation device 1 can be implemented by any computer system such as a PC or a server. Although not illustrated, the ship maneuvering calculation device 1 includes a processor, a memory, an auxiliary storage device, a communication interface device, an input/output interface device, an input device, an output device such as a display device, and others, which are connected to one another via a bus or others. The processor is made of a CPU, a ROM, a RAM, and others. The ship maneuvering calculation device 1 includes a simulation calculation unit 11 and an evaluation unit 12 as functional blocks achieved by software program processing using the processor or others.

The copy 13 of the program 3 of the automatic ship collision avoidance device 2 is previously set as a program for the simulation in the simulation calculation unit 11 of the ship maneuvering calculation device 1. The simulation calculation unit 11 executes the ship maneuvering simulation by using the program of the copy 13. The simulation calculation unit 11 receiving the initial value 101 of the exclusive region (bumper) and the condition 102 as inputs repeatedly executes the calculation of the ship maneuvering simulation at each bumper value 103. The initial value 101 is an optional reference bumper value. The condition 102 is the scenario in the sea area or others. The bumper value 103 includes at least a definition of the shape and the size.

The evaluation unit 12 performs evaluation processing on the result of each simulation simulated by the simulation calculation unit 11. The evaluation unit 12 calculates an evaluation value 105 for each bumper value 104 in each simulation. The ship maneuvering calculation device 1 determines the optimum value 106 of the bumper from the bumper values 104, based on the evaluation value 105 evaluated by the evaluation unit 12. The ship maneuvering calculation device 1 sets information including the determined optimum value 106 of the bumper into the program 3 of the automatic ship collision avoidance device 2. As this setting, an automatic setting update may be executed to the automatic ship collision avoidance device 2 by communication from the ship maneuvering calculation device 1, or the user U1 may operates the setting for the automatic ship collision avoidance device 2 while confirming the setting.

The automatic ship collision avoidance device 2 performs ship collision avoidance support processing (in other words, automatic ship collision avoidance processing) using the program 3 based on the bumper setting value 111. The automatic ship collision avoidance device 2 can be implemented by any computer system such as a PC or a server. Although not illustrated, the automatic ship collision avoidance device 2 includes a processor, a memory, an auxiliary storage device, a communication interface device, an input/output interface device, an input device, an output device, and others, which are connected to one another via a bus or others. In the ship collision avoidance support processing using the program 3, the automatic ship collision avoidance device 2 calculates a collision risk level 112 with respect to other ship, based on the bumper setting value 111. The automatic ship collision avoidance device 2 calculates a preference level 113. The automatic ship collision avoidance device 2 calculates a utility value 114 by using the preference level 113 and the collision risk level 112. The utility value 114 represents the course or others.

The automatic ship collision avoidance device 2 displays information including the obtained utility value 114 on the display screen of the display device 6. Based on the obtained utility value 114, the automatic ship collision avoidance device 2 gives a ship maneuvering instruction associated with the optimum course or others to the automatic steering device 7. The ship maneuvering instruction includes, for example, information on the course altering angle and the speed altering rate. The automatic steering device 7 performs automatic steering of the own ship in accordance with the ship maneuvering instruction.

The automatic ship collision avoidance device 2 acquires own-ship information and other-ship information from the vessel information acquisition device 4. The vessel information acquisition device 4 acquires the own-ship information and the other-ship information by using various mechanisms. The other ship is a single or a plurality of other ships existing within a predetermined range around the own ship. The own-ship information and the other-ship information include information on the course, the speed, and the position. The various mechanisms of the vessel information acquisition device 4 typically include an automatic identification system (AIS), a radar, a camera, a bearing sensor, a speed sensor, a global positioning system (GPS), and others. A computer performs information collection and information processing of various sensors related to the own-ship information and the other-ship information, and obtains information necessary for the automatic ship collision avoidance device 2 such as information on the position, the course, and the speed of the other ships in the surroundings.

The AIS is a system for acquiring the own-ship information or the other-ship information by causing exchange of the vessel information such as a position, a course, a speed, a destination, and others of a vessel between vessels or between a vessel and land through wireless communication. The radar or the camera detects the relative course, speed, and position of each of the other ships existing around the own ship. The bearing sensor is a gyroscopic compass or others, and detects the course of the own ship. The speed sensor is an electromagnetic log, a Doppler log, or others, and detects the speed of the own ship. The GPS detects the position (latitude, longitude, and others) of the own ship.

The automatic ship collision avoidance device 2 refers to the information of the electronic nautical chart 5, sets a route based on the information, and controls the automatic steering device 6 based on the route.

Note that technical content details of the program 3 of the automatic ship collision avoidance device 2 are not limited, and various techniques are applicable. In the first embodiment, the program 3 may be a computer program that generates the ship collision avoidance support information (e.g., the utility value 114) for the course or others by using the bumper setting value.

Each function of the ship maneuvering calculation device 1 and the automatic ship collision avoidance device 2 is mainly achieved by software program processing, but is not limited thereto, and a part of the function may be achieved by, for example, dedicated hardware, circuit, or others. Various necessary data and information including a program are not limited to being stored in a memory or others inside the ship maneuvering calculation device 1 and the automatic ship collision avoidance device 2. The data and information may be stored in an external device (e.g., a database server or a computer-readable recording medium such as a card or a disk) and be used through communication or others. Note that, in the system configuration example in FIG. 1, the ship maneuvering calculation device 1 and the automatic ship collision avoidance device 2 are separated from each other, but the system configuration example is not limited thereto, and a configuration in which the ship maneuvering calculation device 1 and the automatic ship collision avoidance device 2 are integrated with each other is also possible.

[Automatic Ship Collision Avoidance Device]

As a configuration example of the automatic ship collision avoidance device 2 in FIG. 1, an example of schematic processing and operation is as follows. The automatic ship collision avoidance device 2 repeatedly executes a predetermined process for each predetermined control cycle. From the vessel information acquisition device 4, the automatic ship collision avoidance device 2 acquires the own-ship information and the information of the other ship existing within the predetermined range. Next, the automatic ship collision avoidance device 2 calculates a preference level 113 (Pb). The automatic ship collision avoidance device 2 calculates a collision risk level 112 (Rk) by using the bumper setting value 111. Next, the automatic ship collision avoidance device 2 calculates a utility value 114 (Ut) by using the preference level 113 (Pb) and the collision risk level 112 (Rk). Then, the automatic ship collision avoidance device 2 determines the ship maneuvering instruction with the course altering angle and the speed altering rate (corresponding speed) based on the utility value (Ut) as an optimum ship collision avoidance maneuvering method.

For each position in the ship collision avoidance maneuvering space, the automatic ship collision avoidance device 2 calculates, by using the bumper setting value 111, the collision risk level 112 with respect to other ship when the own ship performs the ship collision avoidance maneuvering. The ship collision avoidance maneuvering space is a space made of combination of an option of the course altering angle and an option of the speed altering rate altered from a current state, and represents an option that can be selected in the ship collision avoidance maneuvering. For each position in the ship collision avoidance maneuvering space, the automatic ship collision avoidance device 2 calculates the preference level 113 representing the subjective preference of the ship operator associated with the selection of the position. For each position in the ship collision avoidance maneuvering space, the automatic ship collision avoidance device 2 calculates the utility value 114 by subtracting the collision risk level 112 from the preference level 113.

The automatic ship collision avoidance device 2 stores a planned route on the electronic nautical chart 5 previously set by the user U2 such as the ship operator. The planned route is a route connecting a departure point and a destination point via a plurality of way points (typically, course altering points). The electronic nautical chart 5 is stored in a nonvolatile storage device or others.

The automatic ship collision avoidance device 2 recognizes, for example, the course altering angle and the speed altering rate maximizing the utility value 114, and gives the ship maneuvering instruction including the course altering angle and the speed altering rate to the automatic steering device 7. The automatic steering device 7 includes an autopilot that automatically controls a rudder so as to alter the course toward the course altering angle of the ship maneuvering instruction, a device that automatically controls an engine power so as to alter the speed toward the speed altering rate, and others. The automatic steering device 7 receives the information on the course and the speed from the automatic ship collision avoidance device 2, and performs autonomous navigation toward the next way point while appropriately performing the ship collision avoidance maneuvering in response to the ship maneuvering instruction.

The display screen of the display device 6 displays, for example, a three-dimensional graph representing the resultant utility value 117, in other words, a utility value (FIG. 7 to be described below) for each position in the ship collision avoidance maneuvering space.

[Situation]

Figure 2:
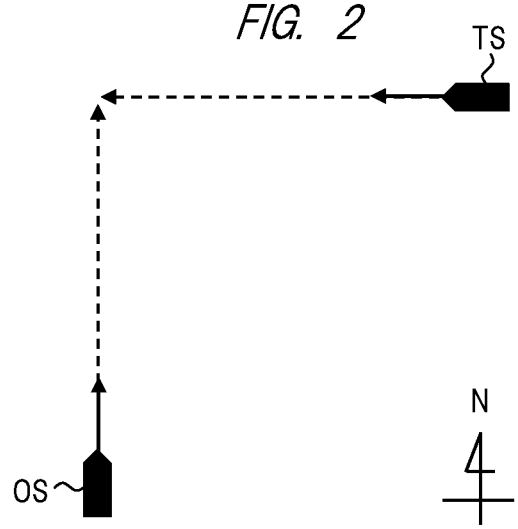
FIG. 2 is a diagram illustrating an example of a situation of an own ship and an other ship in a sea area in the first embodiment.

FIG. 2 illustrates an example of a situation related to collision between the own ship and the other ship in the sea area related to the ship collision avoidance support and the simulation. In this example, the own ship "OS" is traveling toward the north at a predetermined speed, and the other ship "TS" is traveling toward the west at a predetermined speed. If the own ship OS and the other ship TS continue to travel in this state, a possibility of collision arises after elapse of a predetermined time (referred to as a time to closest point of approach). In this case, the own ship OS that is seeing the other ship TS on its right side is obliged to avoid the collision. In such a case, the own ship OS uses the automatic ship collision avoidance device 2 to search for the ship collision avoidance maneuvering method (the utility value 114 described above) for avoiding the collision with a small loss.

[Preference Level]

Figure 3:
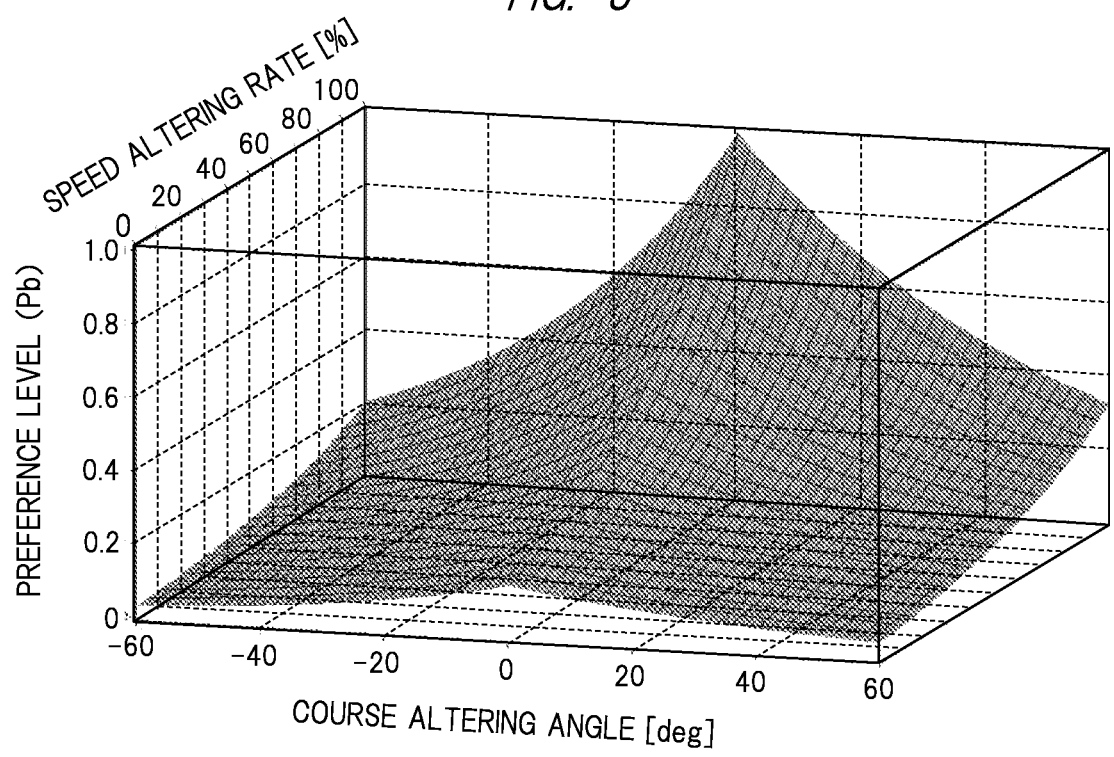
FIG. 3 is a diagram illustrating an example of a ship collision avoidance maneuvering space and a preference level in the first embodiment.

FIG. 3 illustrates an example of a calculation processing result of the preference level 113 in the automatic ship collision avoidance device 2 in FIG. 1. In FIG. 3, the horizontal axis (left-right direction in the drawing) represents the course altering angle [deg], which indicates the range from the leftward course altering of 60 deg to the rightward course altering of 60 deg while taking the original course as 0 deg. The course altering angle is also represented by a symbol "Xi". The vertical axis (depth direction in the drawing) represents the speed altering rate [%], which indicates the range from 0% to 100% while taking the planned speed obtained from the ship operation schedule as 100%. The speed altering rate is also represented by a symbol "Xj". The ship collision avoidance maneuvering space is a space indicated by the horizontal axis (Xi) and the vertical axis (Xj), and is a space representing the option for the ship collision avoidance maneuvering.

Meanwhile, the height axis represents a preference level corresponding to the preference level 113 in FIG. 1, and has a value range from 0 to 1. The closer to 1 the preference level is, the more the preferability is, on the other hand, the closer to 0 the preference level is, the less the preferability is. In general, when there is no obstacle such as other ships or a land area, the ship operator prefers to maintain the original course toward the next way point, prefers to maintain the planned speed for keeping the operation schedule of the ship, and prefers not to alter the course or the speed as much as possible. This operation is, in other words, highly economical ship maneuvering. The preference level is also represented by a symbol "Pb(Xi, Xj)". The preference level Pb(Xi, Xj) is determined by Equation 1 with reference to such subjectivity of the ship operator. Each term in Equation 1 is defined by the exponential functions described in Equations 2 and 3. The automatic ship collision avoidance device 2 calculates the preference level Pb(Xi, Xj) of Equation 1 for each combination of the course altering angle (Xi) and the speed altering rate (Xj) (corresponding position in the ship collision avoidance maneuvering space in FIG. 3).

$$Pb(Xi,Xj)=Pb(Xi,0)\times Pb(0,Xj) \quad \text{Equation 1}$$

$$Pb(Xi,1)=\exp(-Ac\times|\Delta Co|) \quad \text{Equation 2}$$

$$Pb(0,Xj)=\exp(-Av\times|\Delta V|) \quad \text{Equation 3}$$

The term Pb (Xi, 0)) in Equation 2 is also referred to as a course altering preference level. The term Pb (0, Xj) in Equation 3 is also referred to as a speed altering preference level. The course altering preference level Pb (Xi, 1) represents a preference level generated when the course altering angle is altered from 0 deg by the amount ΔCo. Meanwhile, the speed altering preference level Pb (X0, j) represents a preference level generated when the speed altering rate is altered from 100% by the amount ΔV in the case of the course altering angle of 0 deg. The coefficients Ac and Av in Equations 2 and 3 are previously set. The coefficient Ac may be set to a value that is different between the rightward course altering and the leftward course altering.

[Collision Risk Level]

Figure 4:
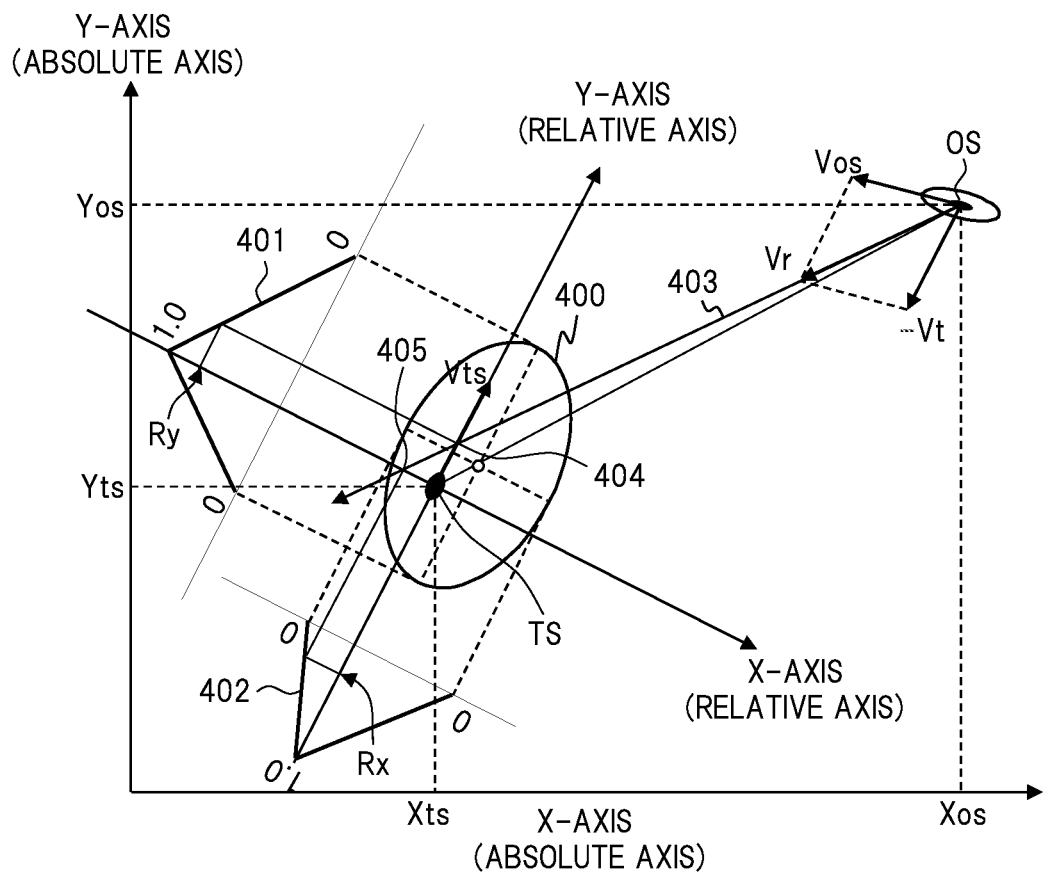
FIG. 4 is an explanatory diagram relating to a collision risk level and a risk function in the first embodiment.
Figure 5:
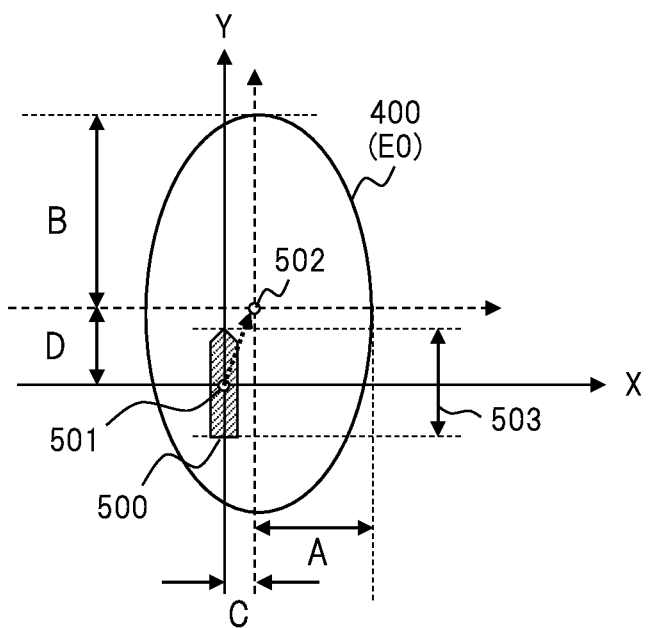
FIG. 5 is a diagram illustrating a basic configuration of an exclusive region in the first embodiment.
Figure 6:
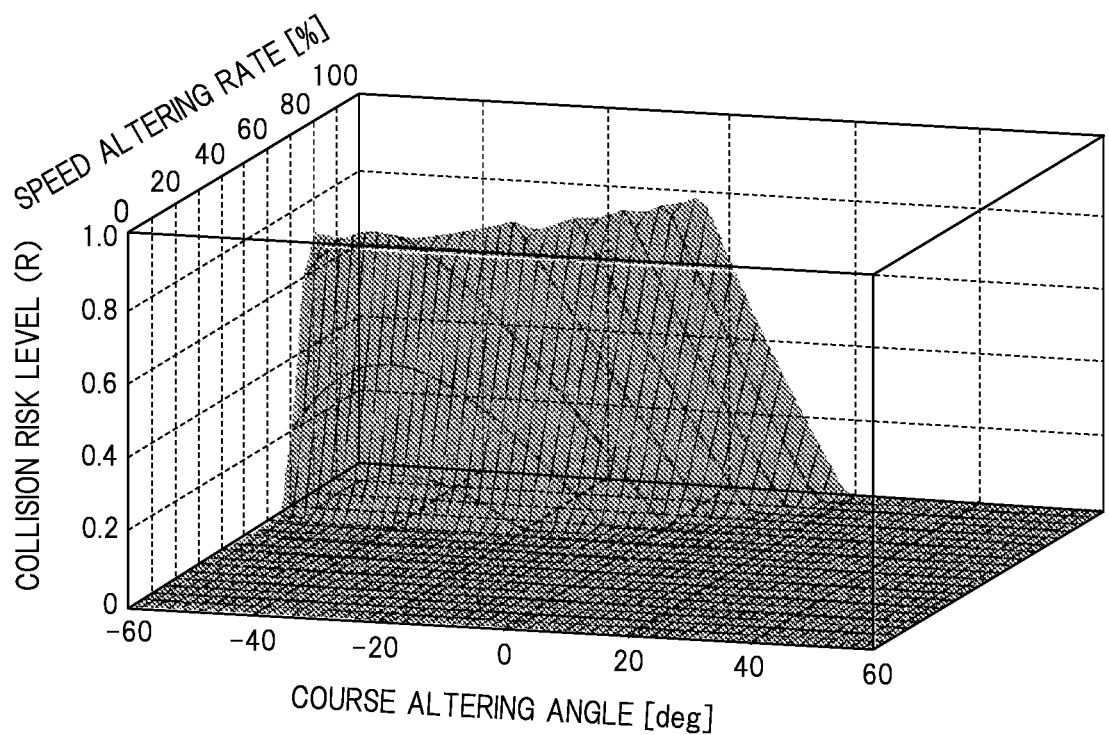
FIG. 6 is a diagram illustrating an example of a ship collision avoidance maneuvering space and a collision risk level in the first embodiment.

FIG. 4 is an explanatory diagram of an example of a calculation processing content of the collision risk level 112 in the automatic ship collision avoidance device 2 in FIG. 1. FIG. 5 is an explanatory diagram of a basic configuration of the exclusive region (bumper). FIG. 6 illustrates an example of a calculation processing result of the collision risk level 112 in the automatic ship collision avoidance device 2 in FIG. 1.

For example, in the case of the situation as illustrated in FIG. 2, the automatic ship collision avoidance device 2 generates the collision risk level 112 as illustrated in FIG. 6. In FIG. 6, the horizontal axis and the vertical axis indicate the same ship collision avoidance maneuvering space as that of FIG. 3. The height axis indicates a collision risk level (Rk) corresponding to the collision risk level 112 in FIG. 1, and has a value range from 0 to 1. The closer to 1 the collision risk level is, the more the risk is, on the other hand, the closer to 0 the collision risk level is, the less the risk is. For each position in the ship collision avoidance maneuvering space in FIG. 6, the automatic ship collision avoidance device 2 calculates the collision risk level (Rk) by using the method as illustrated in FIG. 4.

FIG. 4 illustrates the relative relationship between the own ship OS and the other ship TS, each indicated by a black region. The own ship OS is positioned at coordinates (Xos, Yos) on the absolute axis, and travels to a predetermined course at a speed "Vos". On the other hand, the other ship TS is positioned at coordinates (Xts, Yts) on the absolute axis, and travels to a predetermined course at a speed "Vts". Either one of the own ship OS and the other ship TS is a reference vessel, and the other is a target vessel. The position of the reference vessel is determined as the origin on the relative axis, the course of the reference vessel is determined as the Y-axis on the relative axis, and the axis orthogonal thereto is determined as the X-axis on the relative axis. In the present example, the reference vessel is the other ship TS while the target vessel is the own ship OS. However, because of the relative relationship, the reference vessel may be the own ship OS while the target vessel may be the other ship TS.

On such a relative axis, the own ship OS which is the target vessel travels at a relative speed Vr to a relative course 403 obtained by a synthesized vector made of a vector of the speed Vos and an inverse vector of the speed Vts. Note that the position, course, and speed of the own ship OS are determined based on the own-ship information output from the vessel information acquisition device 4 in FIG. 1. The position, course, and speed of the other ship TS are determined based on the other-ship information output from the vessel information acquisition device 4 in assumption that the other ship TS maintains the course and speed in the current state.

In FIG. 4, an elliptical exclusive region (bumper) 400 is set around the other ship TS which is the reference vessel.

[Exclusive Region (Bumper)]

FIG. 5 illustrates an example of the exclusive region 400 set around a reference vessel 500 (that is the own ship or the other ship, e.g., the own ship). In FIG. 5, on the X-Y plane constituted of the X-axis and the Y-axis for convenience of explanation, the reference vessel 500 is arranged at a position 501 of the origin (0, 0), and the direction of travel of the reference vessel 500 is, for example, the Y-axis (e.g., north). A shape (in this example, a pentagon) corresponding to the external shape of the reference vessel 500 is indicated by a shaded region. On the outer side of the external shape of the reference vessel 500, there is the exclusive region 400 indicated by an elliptical shape. The exclusive region 400 in this example is illustrated in a case with a bumper (referred to as E0) having a reference size and a reference shape based on the initial setting values. The bumper E0 has a diameter (minor diameter) A on the X-axis and a diameter (major diameter) B on the Y-axis as reference sizes. The reference size is determined based on an information pair of two vessels to be calculated, such as the total length (e.g., total length 503) and speed of the own ship, and the total length and speed of the other ship. Not only the total length of the vessel but also the width or others may be used.

A center position 502 of the exclusive region 400 may be a position aligned with the position 501 of the reference vessel 500, or may be a position shifted (in other words, offset, deviated) from the position 501 of the reference vessel 500 as illustrated. In this example, the center position 502 of the bumper E0 is set at a position shifted from the position 501 of the reference vessel 500 by a distance C on the X-axis and a distance D on the Y-axis. Traffic rules or others such that the own vessel is obliged to avoid other vessels crossing from the right side of the traveling direction of the own vessel are reflected on this deviation. The setting of the bumper includes not only the setting of the shape and size but also the setting of such deviation (in other words, shifted position). Note that the center position of the bumper 400 may be set to the center of gravity, the center point in the traveling direction, or the bridge position of the reference vessel 500, or others.

[Collision Risk Level—Risk Function]

As illustrated in FIG. 4, risk functions 401 and 402 are defined by using the bumper 400 as illustrated in FIG. 5. The risk functions 401 and 402 are functions that sequentially changes from a maximum value to a minimum value in a direction from the position (Xts, Yts) of the other ship TS which is the reference vessel toward the outer periphery (the direction on each relative axis) of the bumper 400. Specifically, the risk function 401 is for the Y-axis of the relative axis, takes the maximum value (e.g., 1.0) at the origin coordinates being the position of the other ship TS, and takes the minimum value (e.g., 0) at the maximum coordinates and the minimum coordinates at which the outer periphery of the bumper 400 is located. Similarly, the risk function 402 is for the X-axis of the relative axis, takes the maximum value (e.g., 1.0) at the origin coordinates, and takes the minimum value (e.g., 0) at the maximum coordinates and the minimum coordinates at which the outer periphery of the bumper 400 is located. In the present example, the risk functions 401, 402 are linearly configured.

Based on the bumper 400 and the risk functions 401 and 402 as illustrated in FIG. 4, the automatic ship collision avoidance device 2 in FIG. 1 calculates the collision risk level 112 by calculating the values of the risk functions 401 and 402 in accordance with a future position of the own ship OS which is the target vessel and will pass within the bumper 400. Specifically, the automatic ship collision avoidance device 2 sets a relative axis having the origin to be the position (Xts, Yts) of the other ship TS when the own ship OS travels on the relative course 403, the X-axis to be a bow direction of the other ship TS, and the Y-axis to be a ship measurement direction, recognizes intersection coordinates 404 of the relative axis with the Y-axis, and calculates the value of the risk function 401 corresponding to the intersection coordinates 404 as a Y-axis collision risk level "Ry". Similarly, the automatic ship collision avoidance device 2 recognizes intersection coordinates 405 of the relative axis with the X-axis, and calculates the value of the risk function 402 corresponding to the intersection coordinates 405 as an X-axis collision risk level "Rx".

The automatic ship collision avoidance device 2 calculates the collision risk level 112 by applying a predetermined weight to the larger value of either the Y-axis collision risk level Ry or the X-axis collision risk level Rx as illustrated in the following Equation 4. The collision risk level 112 is also represented by a symbol R (Xi, Xj). The terms Xi and Xj in this case are the course altering angle (Xi) and the speed altering rate (Xj), respectively. If it is assumed that the course or speed is altered from the time point of the calculation of the above-described terms Rx and Ry, the terms Rx and Ry are expressed by functions of Xi and Xj, respectively, because of the altering of the relative course of the own ship OS. In the Equation 4, a calculation "max (Rx, Ry)" shows that the larger value of either the Y-axis collision risk level Ry or the X-axis collision risk level Rx is used. A term "Tc" is the time to closest point of approach, and a term "Wt" is a preset constant time. In the Equation 4, the weighting is performed such that the shorter the time Tc to closest point of approach is, the higher the collision risk level R (Xi, Xj) is.

$$R(Xi,Xj)=\max(Rx,Ry)\times(1-Tc/Wt) \qquad \text{Equation 4}$$

In practice, a plurality of other ships (q ships, where "q" is an integer of 2 or more) may exist within a predetermined range from the own ship. Among the plurality of other ships, it is necessary to consider at least the other ship having the greatest influence on the collision. Accordingly, the target other ship (i.e., the other ship having the greatest influence) may vary depending on each position in the ship collision avoidance maneuvering space in FIG. 6.

Therefore, in practice, a collision risk level Rk (Xi, Xj) described in the following Equation 5 is used instead of the collision risk level R (Xi, Xj) of the Equation 4. The collision risk level Rk (Xi, Xj) in the Equation 5 is determined by the collision risk level R (Xi, Xj) with respect to the other ship having the greatest influence among a single or a plurality of other ships for each position in the ship collision avoidance maneuvering space. A calculation "max" shows that the maximum value among the collision risk levels R (Xi, Xj) from k=1 to q representing the other ships is used.

$$Rk(Xi,Xj)=\max\{R(Xi,Xj)\} \qquad \text{Equation 5}$$

[Utility Value]

Figure 7:
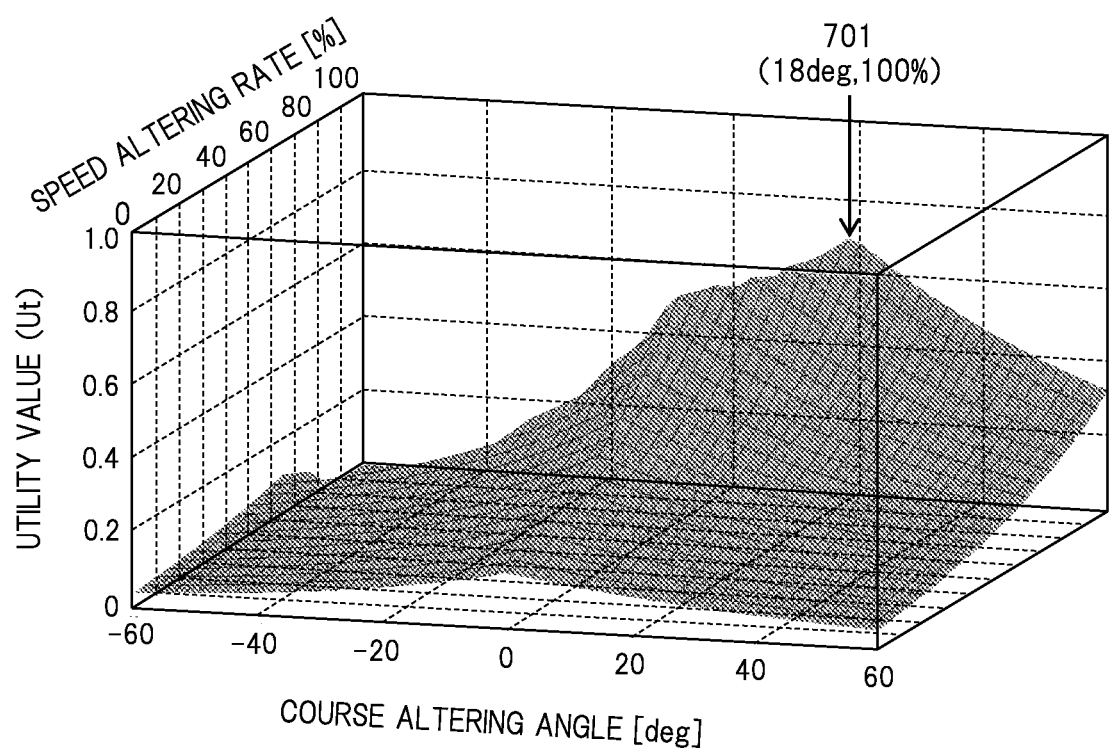
FIG. 7 is a diagram illustrating an example of a ship collision avoidance maneuvering space and a utility value in the first embodiment.

FIG. 7 illustrates an example of a calculation processing result of the utility value 114 in the automatic ship collision avoidance device 2 in FIG. 1. The horizontal axis and the vertical axis indicate the same ship collision avoidance maneuvering space as that of FIG. 3. The height axis indicates a utility value corresponding to utility value 114 and has a value range from 0 to 1. The closer to 1 the utility value is, the more the effect is, on the other hand, the closer to 0 the utility value is, the less the effect is. The utility value 114 is also represented by a symbol Ut (Xi, Xj). As illustrated in the following Equation 6, for each position in the ship collision avoidance maneuvering space in FIG. 7, the automatic ship collision avoidance device 2 calculates the utility value Ut (Xi, Xj) by subtracting the collision risk level Rk (Xi, Xj) in the Equation 5 from the preference level Pb (Xi, Xj) in the Equation 1. In this case, the collision risk level Rk (Xi, Xj) is specifically weighted by a predetermined coefficient "α".

$$Ut(Xi,Xj)=Pb(Xi,Xj)-\alpha\times Rk(Xi,Xj) \qquad \text{Equation 6}$$

Because of such calculation, the utility value Ut in FIG. 7 is obtained by subtracting the collision risk level R (particularly Rk) in FIG. 6 from the preference level Pb in FIG. 3. The ship collision avoidance maneuvering method such as the optimum course is a method maximizing the utility value Ut (Xi, Xj). In the example of FIG. 7, at the maximum value 701 (corresponding position) of the utility value Ut, the course altering angle is 18 deg, and the speed altering rate is 100%. In other words, the optimum ship collision avoidance maneuvering method is a method of performing the rightward course altering at the course altering angle of 18 deg while maintaining the speed. The automatic ship collision avoidance device 2 gives the ship maneuvering instruction as the optimum ship collision avoidance maneuvering method to the automatic steering device 7, with the course altering angle and the speed altering rate corresponding to the position (maximum value 701) in the ship collision avoidance maneuvering space having the maximized utility value Ut.

Note that the automatic ship collision avoidance device 2 may display the information such as the preference level in FIG. 3, the collision risk level in FIG. 6, and the utility value in FIG. 7 on the display screen of the display device 6 in a form such as a three-dimensional graph including the ship collision avoidance maneuvering space. Similarly, the ship maneuvering calculation device 1 may also display information such as the utility value in the simulation on the display screen.

[Ship Maneuvering Calculation Device]

The outline of the premise automatic ship collision avoidance device 2, in particular the program 3, has been described above. Next, the ship maneuvering calculation device 1 that performs the ship maneuvering simulation using the program 3 will be described.

[System Usage Cycle]

Figure 8:
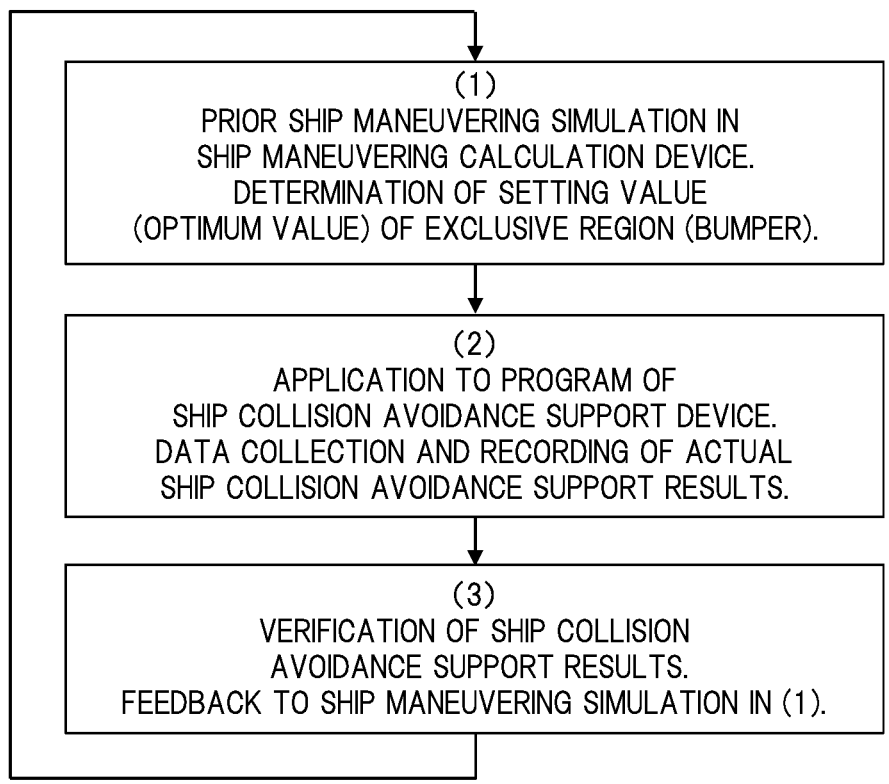
FIG. 8 is a diagram illustrating a system usage cycle in the first embodiment.

FIG. 8 illustrates a schematic cycle related to the use of the system. (1) The user U1 in FIG. 1 repeatedly executes a prior ship maneuvering simulation while changing the parameter of the bumper in the ship maneuvering calculation device 1. Thus, the ship maneuvering calculation device 1 determines the optimum value 106 of the bumper at this time point.

(2) The user U1 sets the optimum value 106 of the bumper determined in the above-described item (1) as the bumper setting value 111 in the program 3 of the actual automatic ship collision avoidance device 2. The automatic ship collision avoidance based on the program 3 of the automatic ship collision avoidance device 2 is applied during actual navigation of a vessel. The automatic ship collision avoidance device 2 records data related to the own-ship information and the other-ship information as a history together with monitoring at the time of the automatic ship collision avoidance and the ship collision avoidance support. The ship maneuvering calculation device 1 collects and records the history data from the automatic ship collision avoidance device 2. The user U1 and the ship maneuvering calculation device 1 also collect, if any, data of failure events such as an event where the ship operator who is the user U2 takes the ship maneuvering right to perform the ship collision avoidance operation independently because of failure in the automatic ship collision avoidance.

(3) The user U1 performs verification related to the automatic ship collision avoidance and ship collision avoidance support function by using the history data in the above-described item (2). The verification is, for example, verification of whether or not the operation result of the automatic ship collision avoidance device 2 using the bumper setting value has been appropriate. The user U1 performs feedback to the ship maneuvering simulation in (1) based on the verification result. The feedback includes, for example, reviewing the scenario and the initial value of the bumper, and confirming the validity of the assessment.

As described above, the simulation and others are repeated in a cycle such as PDCA cycle. Thus, it is possible to update the bumper setting value to a more suitable or optimum value by taking advantage of the experience of actual navigation. In other words, as a result, the ship collision avoidance support function can be further enhanced.

[Ship Maneuvering Calculation Device—Process Flow]

Figure 9:
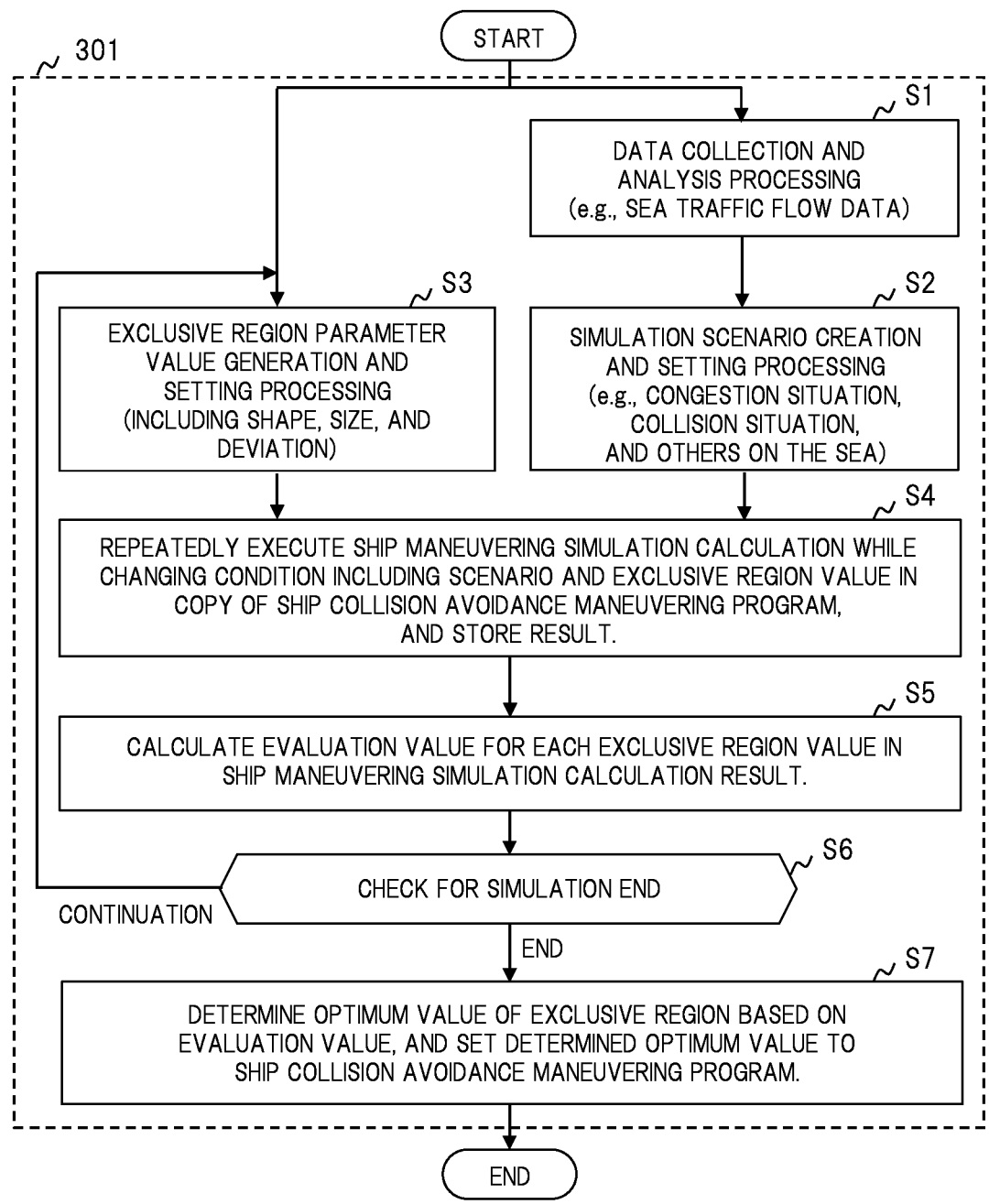
FIG. 9 is a diagram illustrating a flow of main processing of the ship maneuvering calculation device in the first embodiment.

FIG. 9 illustrates a flow of main processing in the ship maneuvering calculation device 1. The flow in FIG. 9 includes steps S1 to S7. In step S1, based on the operation of the user U1, the ship maneuvering calculation device 1 collects various kinds of data to be used for the ship maneuvering simulation, and performs analysis processing or others. The data to be collected is, for example, sea traffic flow data. The sea traffic flow data is the navigation data of the vessel in the actual sea area. The sea traffic flow data is obtained based on, for example, AIS data or radar observation data. The ship maneuvering calculation device 1 obtains data including ship type, the ship model, the ship track, and others from the sea traffic flow data by arrangement and analysis processing.

In step S2, based on the operation of the user U1, the ship maneuvering calculation device 1 creates an evaluation scenario (simulation scenario) for the ship maneuvering simulation, and sets the created evaluation scenario as one of the conditions 102 in FIG. 1 (in other words, one of the program setting information) into the copy 13 of the program 3. The scenario is, for example, a combined scenario of the sea area type (such as a far sea, a near sea, or a bay), the ship type, the situation related to congestion or collision between the own ship and the other ship (a single or a plurality of other ships) on the sea, in other words, the relative relationship in the traveling direction, the speed, and others, the sea area or situation where marine accidents or near-misses have actually been reported in the past, the data based on the data collected from the actual ship maneuvering of the automatic ship collision avoidance device 2 (FIG. 8) described above and others.

In step S3, based on the operation of the user U1 or by automatically the system, the ship maneuvering calculation device 1 generates a plurality of exclusive region values 103 which are variously different in the shape, the size, the deviation, and others as parameter values of the exclusive region, and sets the corresponding exclusive region value 103 into the copy 13 for each simulation.

In step S4, the ship maneuvering calculation device 1 repeatedly executes the ship maneuvering simulation calculation while variously changing the combination of the condition 102 including the scenario in step S2 and the exclusive region value 103 in step S3 in the copy 13 of the program 3, and stores the result of each simulation into the memory.

In step S5, the ship maneuvering calculation device 1 calculates the evaluation value 105 for each exclusive region value 104 in the ship maneuvering simulation calculation result, and stores the calculated evaluation value into the memory.

The search for the optimum value of the bumper may be performed as follows. The ship maneuvering calculation device 1 searches for the optimum value by performing recursive processing such as automatically generating another plurality of parameter candidates near the exclusive region value 104 having a high evaluation result, returning to step S4 again, and repeating the ship maneuvering simulation. In other words, the ship maneuvering calculation device 1 repeatedly executes the simulation calculation on a plurality of prepared bumper parameter values by using the ship collision avoidance maneuvering program, calculates the evaluation value based on the simulation result in accordance with the parameter values, and determines the optimum value based on the evaluation value from the parameter values. Further, the ship maneuvering calculation device 1 sets a plurality of new parameter values near the parameter values, and searches for the optimum solution space of the parameter values by repeating the simulation, the evaluation, and the determination of the optimum value.

In step S6, the ship maneuvering calculation device 1 confirms whether or not to end the ship maneuvering simulation, and proceeds to step S7 when the ship maneuvering simulation is to be ended, or returns to step S3 and step S2 when the ship maneuvering simulation is to be continued. This end may be achieved by, for example, the user U1 who performs an end instruction operation or satisfaction of a preset simulation end condition (e.g., a case where all combinations of parameter values are tested). If the process returns to step S3, a bumper parameter value different from the previous values is set, and the simulation is similarly performed in step S4.

In step S7, the ship maneuvering calculation device 1 determines the optimum value 106 of the exclusive region, based on each evaluation value 105 for each exclusive region value 104 in each of the ship maneuvering simulation results already held in the memory. In other words, the exclusive region value 104 having the highest evaluation value 105 is selected. The ship maneuvering calculation device 1 sets the determined optimum value 106 of the exclusive region as the exclusive region setting value 111 into the program 3 of the automatic ship collision avoidance device 2. In other words, the exclusive region setting value 111 in the program 3 is updated.

Note that the processes of step S2 and step S3 may be performed simultaneously in parallel, or may be performed sequentially. When the scenario in step S2 and the parameter values of the bumper in step S3 have a predetermined relationship, the ship maneuvering calculation device 1 manages and holds the relationship as information. For example, if there may be scenarios A, B, and C, a combination relationship may be defined such that parameter values P1 and P2 are applied in the scenario A, parameter values P3 and P4 are applied in the scenario B, and the parameter values P1 to P4 are applied in the scenario C.

In the example of FIG. 9, note that the evaluation processing (step S5) is performed in each loop. However, the present invention is not limited thereto, and the evaluation processing may be performed collectively after the results of a plurality of simulations are obtained. Note that the copy 13 is not limited to being exactly the same as the program 3, and may have a configuration to which a program portion for the processing in the ship maneuvering calculation device 1 is added.

Note that a portion 301 indicated by a broken line frame in FIG. 9 indicates a range in which the AI including machine learning can be used. For example, the ship maneuvering calculation device 1 can estimate the information of the surrounding other ships with high accuracy using a plurality of pieces of sensor information such as the radar, the camera, and the AIS of the vessel information acquisition device 4 (FIG. 1). The data collected by the ship maneuvering calculation device 1 can also be used to automatically create a new scenario. Further, for the result of evaluating the plurality of exclusive region values by the ship maneuvering simulator (ship maneuvering calculation device 1) using the evaluation scenario, the relationship between the input and the output is machine-learned using the result of the ship maneuvering simulator while the scenario and the exclusive region value is taken as the input value and the evaluation value is taken as the output value, and the evaluation for the scenario and the bumper shape is modeled and stored. Thus, when the results of the ship maneuvering simulator are accumulated to some extent, the evaluation value of the bumper shape can be predicted based on the past data without using the ship maneuvering simulator. When the operation of the ship maneuvering calculation device 1 progresses to advance the data accumulation of the events, the optimum solution can be found by running the ship maneuvering simulator every time for various cases. However, even in this case, it is sufficiently conceivable to cause a situation in which the application of the simulation is difficult to all scenarios because of effectiveness although it cannot be determined whether another scenario to which the simulation is not applied is optimum or not. In such a case, the learning data taking the scenario of the ship maneuvering simulator as an input value and taking a parameter value of the exclusive region corresponding to the scenario as an output value is modeled by the machine learning. Thus, if such pairs of the inputs and the outputs are sufficiently accumulated as data, it is possible to construct a learning model that outputs the optimum shape and size of the exclusive region for any scenario. Therefore, it is possible to greatly utilize the advantage of the accumulation of the data collection based on the widened application of the ship maneuvering calculation device 1, the expansion of the scenario, and the determination of the optimum value based on the ship maneuvering simulation based on this.

[Parameter Value of Exclusive Region (Bumper)]

Figure 11:
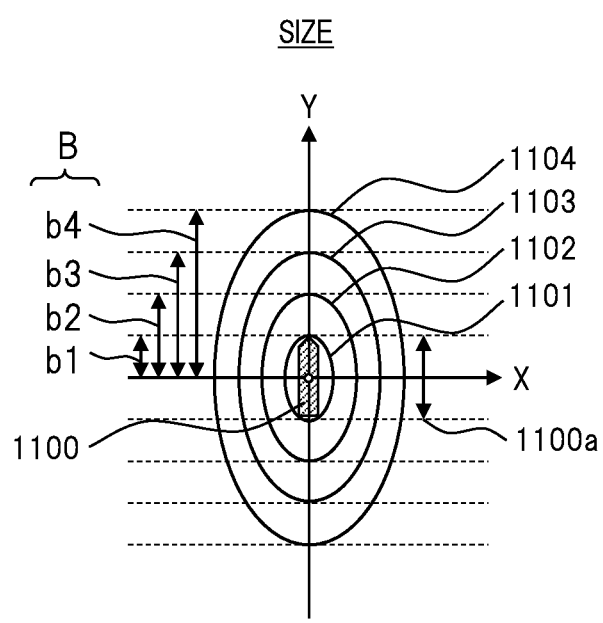
FIG. 11 is a diagram illustrating an example of a size of the exclusive region in the first embodiment.
Figure 12:
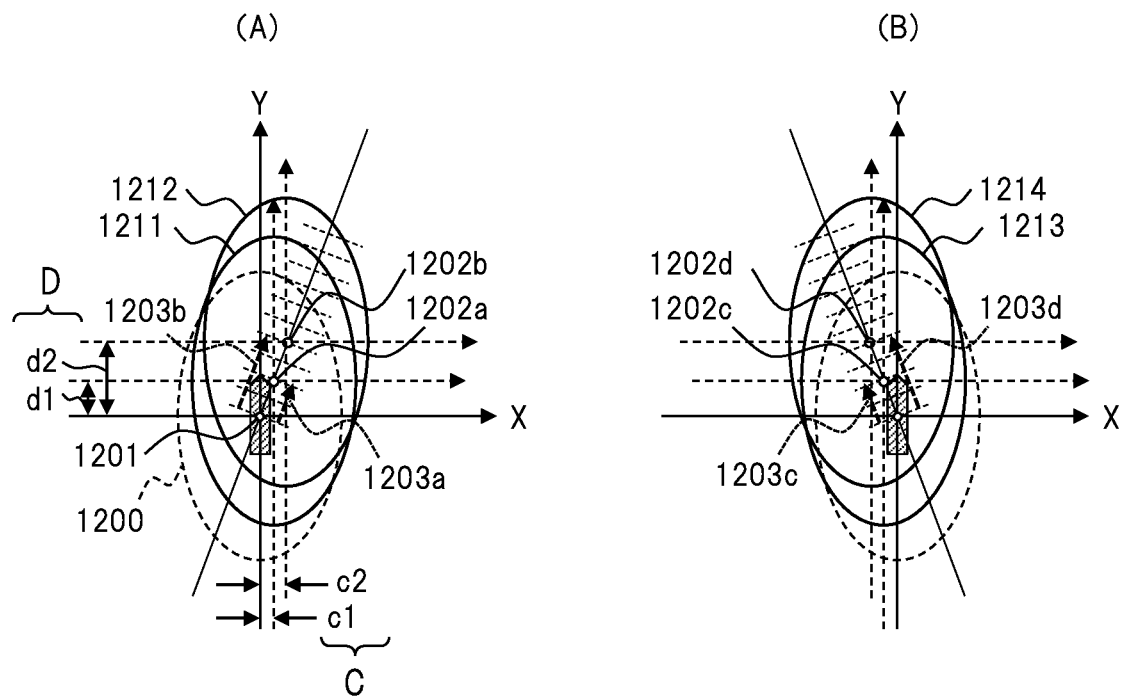
FIG. 12 is a diagram illustrating an example of deviation of the exclusive region in the first embodiment.

FIGS. 10 to 12 illustrate generation of the exclusive region value 103 which is a parameter for the ship maneuvering simulation in FIG. 1 based on the exclusive region (bumper) which is the basic concept illustrated in FIG. 5. The ship maneuvering calculation device 1 generates various exclusive region values 103 by setting each element constituting the bumper to be a variable value.

The elements constituting the bumper (the exclusive region value 103 and the exclusive region setting value 111) include the shape, the size, the deviation and others. As for the shape, FIG. 5 shows only the elliptical shape. However, various shapes are exemplified as illustrated in FIG. 10. An exclusive region 1001 in FIG. 10(A) shows a case of the ellipse shape as a first type. Note that the ellipse can be defined by its diameter, focal position, or others. An exclusive region 1002 in FIG. 10(B) shows a case of a rectangle as a second type. An exclusive region 1003 in FIG. 10(C) shows a case of a shape (vessel external shape extended figure) obtained by enlarging and extending a vessel external shape 1100 outward at an equal magnification as a third type. In this example, the vessel external shape 1100 and the exclusive region 1003 each has the simplified pentagon shape. However, actual detailed vessel external shapes (e.g., shapes including curves) may be used. The shape may be defined by data of computer graphics (CG) or others, and has positional coordinates for each point constituting, for example, a line or a region. The shape of the bumper is not limited to the above examples, and may be any shape that can be expressed by a polygonal shape, a polygon, a mathematical expression, or others, and a shape selected from the shapes described above in consideration of the simulation performance may be used. As for the reference vessel shape, only one type is illustrated. However, the shape is not limited thereto, and there are various shapes depending on the ship type and the ship model. FIG. 10(D) shows an example in which the shape of the bumper is formed of the polygon. A FIG. 1004 is formed of a previously-registered polygon which is changeable in a size in the X and Y directions and rotatable by a rotation angle θ.

The size is expressed by the constant diameter (A,B) of the ellipse in FIG. 5. However, various sizes are exemplified as illustrated in FIG. 11. FIG. 11 illustrates an example of a variable size in the case where the bumper shape is the ellipse. Each size is similarly generated for each shape type. The vessel external shape 1100 is a figure representing a schematic shape of the target vessel. A bumper 1101 is of a first size. As the size parameter, only the diameter B of the Y-axis constituting the ellipse is illustrated here. However, the same applies to the diameter A of the X-axis. Size values b1 to b4 are illustrated as examples of the parameter values related to the diameter B.

The exclusive region 1101 is of the first size and has the size value b1. The size value b1 indicates a case of a minimum enclosing ellipse (in other words, a circumscribed ellipse) for the vessel external shape 1100. The size value b1 is roughly a value corresponding to a ship length 1100a. An exclusive region 1102 is of the second size and has the size value b2. The size value b2 indicates a case where the size value b2 is twice as large as the size value b1. Similarly, cases where the size value b3 of the exclusive region 1102 and the size value b4 of an exclusive region 1104 are three times and four times as large as the size value b1, respectively, are illustrated. The size values are not limited thereto, and a plurality of size values having a smaller size-value step therebetween step may be generated. The number and the value-size step of the parameter values may be determined in consideration of the simulation calculation performance. Thus, the simulation calculation unit 11 generates the plurality of size values within, for example, a predetermined range (a range from the minimum value to the maximum value).

The variation of the size of the bumper may be linear as shown in the example of FIG. 11, or may be non-linear, or a previously-defined function may be used.

As for the deviation, FIG. 5 shows the certain deviation amount (C, D). However, various deviations are exemplified as illustrated in FIG. 12. FIG. 12 illustrates four deviation examples caused when the shape is the ellipse. The deviation indicates the shifted position of the exclusive region relative to the position of the vessel as described above. In FIG. 12(A), an exclusive region 1200 is a region before the deviation, and is positioned at the origin aligned with a position 1201 of the reference vessel in the X-Y plane illustrated in the drawing. An exclusive region 1211 shows a case of a first deviation. A position 1202a is a center position of the exclusive region 1211 after the deviation. A vector 1203a shows a deviation (direction and distance), and has a deviation amount c1 on the X-axis and a deviation amount d1 on the Y-axis. The deviation parameter value of the exclusive region 1211 can be expressed by the vector 1203a, the deviation amount (c1, d1) or others. An exclusive region 1212 shows a case of a second deviation having a different distance (e.g., twice the first deviation) in the same direction as the first deviation. The deviation can be expressed by a vector 1203b, a deviation amount (c2, d2) or others. The deviation in FIG. 12(A) is based on the assumption that, for example, the own ship alters the course to the right.

Similarly, FIG. 12(B) illustrates cases of a third deviation and a fourth deviation as deviation examples in directions different from those in FIG. 12(A). The deviation in FIG. 12(B) is based on the assumption that, for example, the own ship alters the course to the left. An exclusive region 1213 shows a case of the third deviation, and can be represented by a vector 1203c or others. An exclusive region 1214 shows a case of the fourth deviation having a different distance (e.g., twice the second deviation) in the same direction as that of the second deviation, and can be represented by a vector 1203d or others.

Thus, the simulation calculation unit 11 generates a plurality of deviation parameter values within, for example, a predetermined range (a range from the minimum value to the maximum value). The minimum value is 0, i.e., no deviation.

[Example of Generation and Setting Processing of Bumper Value]

An example of the generation and setting processing of the bumper value 103 in step S3 in FIG. 9 may be as follows. In step S3-1, the simulation calculation unit 11 first sets the type of bumper shape. The type of the bumper shape includes, for example, an ellipse, a rectangle, a pentagon and others. Next, in step S3-2, the simulation calculation unit 11 generates each size value in the shape within the set range, based on the bumper shape of the above set type.

During step S3, the user U1 may select the type to be used from the default types of bumper shapes on the display screen of the ship maneuvering calculation device 1, and may set the selected type as the initial value 101. The user U1 may previously set the shape, size, deviation, and others of the reference bumper by operating the ship maneuvering calculation device 1. The ship maneuvering calculation device 1 may automatically generate each bumper value 103 by setting the size or others to be variable while setting the reference bumper as the initial value 101.

[Elements Affecting Determination of Exclusive Region (Bumper)]

The exclusive region is set in order to, for example, secure a safe pass-by distance around the own ship. Elements affecting determination of the shape, size, and others of the bumper are exemplified as follows. A content in parentheses "[ ]" indicates a Unit.

Ship type, ship model
Lengths of own ship and other ship: LoA (Length of All) [m]
Speed of own ship: True Speed [Kt]
Relative distance [mile]
Blocking coefficient (blocking coefficient in ship collision avoidance maneuvering space): BC [%]
Navigable region
Turning radius Note that the Patent Document 1 describes the blocking coefficient. The blocking coefficient corresponds to the level of congestion in the ship collision avoidance maneuvering space. The navigable region corresponds to topographical and geographical constraints on the electronic nautical chart.

The above-described deviation may be set in the bumper in order to achieve the ship maneuvering in accordance with the maritime law including the collision prevention law. Various elements are included in elements for determining the deviation as similar to the above description.

The ship maneuvering calculation device 1 performs the ship maneuvering simulation for each bumper value 103 generated in consideration of the above-described elements, based on the condition 102 such as the scenario created in consideration of the above-described elements, and thus, determines the optimum value 106 of the bumper.

[Modification Example of Exclusive Region]

Figure 13:
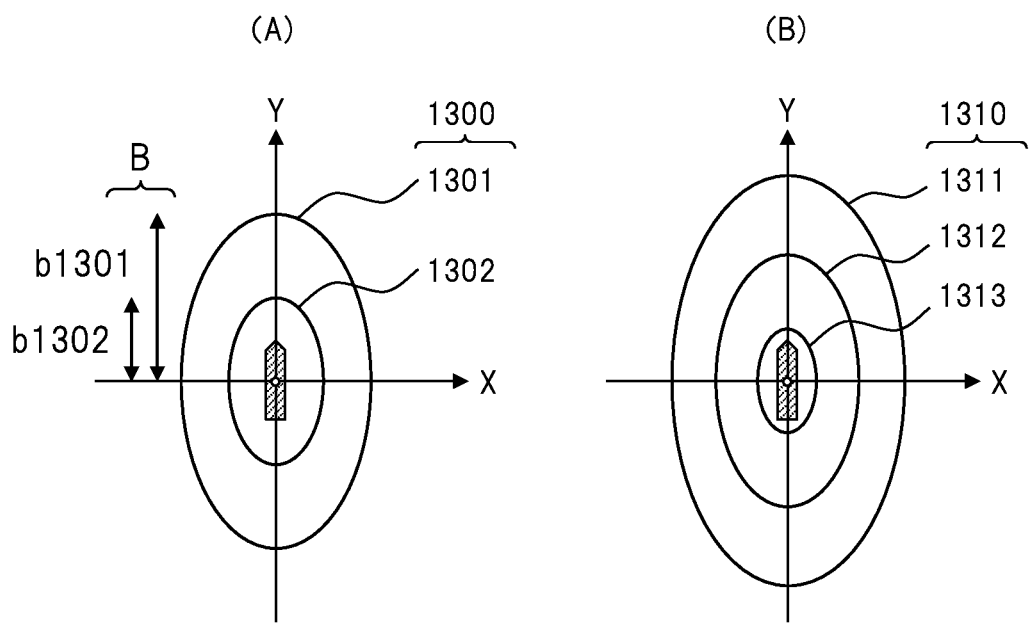
FIG. 13 is a diagram illustrating an example in which exclusive region is composed of a plurality of portions in a modification of the first embodiment.

As a modification example, the exclusive region may be composed of a plurality of portions as follows. FIG. 13 illustrates an example in which a certain exclusive region (in the case of the elliptical shape) is composed of a plurality of types of regions. FIG. 13(A) illustrates an example in which a certain exclusive region is composed of two types of portions as a narrower concept. The first portion may be referred to as a soft bumper while the second portion may be referred to as a hard bumper. One exclusive region 1300 is composed of a set of a bumper 1301 which is the soft bumper and a bumper 1302 which is the hard bumper. The size (e.g., diameter b1302) of the bumper 1302 is smaller than the size (e.g., diameter b1301) of the bumper 1301. The soft bumper which is the first portion is a region that ensures a sufficient navigable distance. The sufficient navigable distance is a region where the ship operator may feel insecure but can allow other ships to intrude. The hard bumper which is the second portion is a region that ensures a limit passing-by distance. The limit passing-by distance is a region where the intrusion of other ships is absolutely not desirable for the safety of the own ship.

FIG. 13(B) illustrates another configuration example. One exclusive region 1310 is composed of a set of three types of portions that are a first bumper 1311 which is a safety region, a second bumper 1312 which is a caution region, and a third bumper 1313 which is a danger region. The safety region is a region that is sufficiently widely secured with a margin, the caution region is a region where attention should be paid in the case of the intrusion of other ships as being beyond the region boundary line, and the danger region is a region that is dangerous in the case of the intrusion of other ships.

Even when a certain bumper setting value 111 is constituted by the set of the plurality of types of portions as described above, the ship maneuvering calculation device 1 similarly determines the optimum value for each portion by performing the simulation.

[Case of Usage of Blocking Coefficient]

The ship maneuvering calculation device 1 may variably generate the size of the bumper or others by using the blocking coefficient described above. Specific examples are as follows. FIG. 14 illustrates an example of a situation in a sea area. FIG. 14(A) illustrates a case where a plurality of other ships exists in a bay as an example of a situation having a high blocking coefficient, and FIG. 14(B) illustrates a case where a single other ship exists in a far sea as an example of a situation having a low blocking coefficient. In FIG. 14(A), other ships TS1, TS2, TS3, and TS4 exist as other ships relative to the own ship OS. This is a situation in which, for example, the other ship TS1 is about to cross from right to left while the own ship OS is traveling forward (e.g., to the north). Three states at time points t=t1, t2, and t3 are illustrated as the states of the own ship OS and the other ship TS1. The own ship OS avoids the collision with the other ship TS1 by altering the course to, for example, the right. The illustration is in an example in which bumpers 1401 of the own ship OS and the other ship TS1 have sizes corresponding to the situation having this blocking coefficient. A distance 1410 indicates the distance to closest point of approach at the time point t3.

FIG. 14(B) illustrates a situation in which the other ship TS1 exists as the other ship relative to the own ship OS, and in which the other ship TS1 is about to cross from right to left while the own ship OS is traveling forward as similar to FIG. 14(A). The own ship OS avoids the collision with the other ship TS1 by altering the course to, for example, the right. The illustration is in an example in which bumpers 1402 of the own ship OS and the other ship TS1 have sizes corresponding to the situation having this blocking coefficient. A distance 1420 indicates the distance to closest point of approach at the time point t3.

The bumper 1401 in FIG. 14(A) is set to be smaller in size than the bumper having the reference size due to the high blocking coefficient. On the other hand, the bumper 1402 in FIG. 14(B) is set to be larger in size than the bumper having the reference size due to the low blocking coefficient. When the size of the bumper 1401 is small as illustrated in FIG. 14(A), a range of the risk function as illustrated in FIG. 4 is narrowed, and therefore, a range of the course altering angle causing the high collision risk level is also narrower than that of the example of FIG. 6. As a result, among the preference level and the collision risk level for determining the utility value, the influence of the preference level is relatively higher. The course altering angle maximizing the utility value shifts from that of the example of FIG. 7 toward the 0 deg. When the size of the bumper 1402 is large as illustrated in FIG. 14(B), the range of the risk function is widened, and therefore, the range of the course altering angle causing the high collision risk level is also wider than that of the example of FIG. 6. As a result, among the preference level and the collision risk level for determining the utility value, the influence of the collision risk level is relatively higher. The course altering angle maximizing the utility value shifts from that of the example of FIG. 7 toward a side away from 0 deg.

For example, the congestion level described above is included as one element of the scenario. The ship maneuvering calculation device 1 determines a suitable bumper size in accordance with a scenario including the congestion level by the ship maneuvering simulation.

[Bumper Setting Method]

The following methods are exemplified as a method of applying the bumper value 103 to each ship to be calculated at the time of the bumper setting and the ship maneuvering simulation in the ship maneuvering calculation device 1. Either method is applicable.

(1) A method of setting a bumper to only one reference vessel (e.g., the own ship) in a pair of the own ship and the other ship to be calculated.

(2) A method of setting each bumper to each of both vessels in the pair of the own ship and the other ship to be calculated.

When each bumper is set to each vessel, either method is applicable to a case where the same bumper is set to each vessel and a case where a different bumper is set to each vessel.

The following methods are exemplified as a method of calculating the utility value or others of each ship to be calculated at the time of the bumper setting and the ship maneuvering simulation in the ship maneuvering calculation device 1. Either method is applicable.

(1) A method of calculating the utility value or others of only one reference vessel (e.g., the own ship) in a pair of the own ship and the other ship to be calculated. In this case, it is assumed that the other vessel (e.g., the other ship) navigates along a predetermined lane or others to follow the set scenario. In other words, it is assumed that the other vessel does not have intelligence such as collision avoidance and optimum course selection.

(2) A method of calculating the utility value or others of each of both vessels in the pair of the own ship and the other ship to be calculated. In this case, the both vessels have such intelligence, and causes interaction such as the course altering in accordance with the situation.

[Evaluation]

Next, an example of the evaluation processing (step S5 in FIG. 9) performed by the evaluation unit 12 of the ship maneuvering calculation device 1 in FIG. 1 will be described. The evaluation unit 12 calculates a score as the evaluation value 105 for each bumper value 104 associated with the simulation calculation result calculated by the simulation calculation unit 11. The evaluation unit 12 is composed of a program (ship maneuvering evaluation program) for the evaluation processing or others. As described above, each bumper value 104 includes parameter values that define the shape, the size, the deviation, and others. Each bumper value 104 has a relationship with a condition such as the scenario applied to each simulation. In each simulation result, the above-described utility value 114 or others is calculated for each bumper value 104. The evaluation unit 12 calculates the score with reference to the utility value 114 or others for each bumper value 104.

Note that the program for the evaluation processing of the evaluation unit 12 may be embedded in the program (copy 13) of the simulation calculation unit 11. In this case, the score is calculated and recorded in association with the simulation calculation.

The content details of the evaluation processing of the evaluation unit 12 are not limited. An example of the evaluation processing will be described below. The following evaluation processing is in a case of an evaluation method in which safety and economic efficiency are taken into consideration based on the Auto Grading System. The Auto Grading System has, for example, the following scoring items and scoring methods.

Examples of the scoring items include "passing-by of other ships and obstacles", "speed", and "navigation prohibition zone". The scoring methods and criteria for each scoring item are as follows. In the scoring method for the scoring item "passing-by of other ships and obstacles", the "collision danger region" is converted into a numerical value, based on the "distance" to the obstacles such as the other ships and the "relative bearing change rate" as viewed from the own ship, and point-deduction scoring is performed. In the scoring method for the scoring item "speed", shift time from a preset speed in a route or others is converted into a numerical value, and point-deduction scoring is performed. In the scoring method for the scoring item "navigation prohibition zone", time of entrance of the ship in a navigation prohibition zone is converted into a numerical value, and point-deduction scoring is performed.

Figure 15:
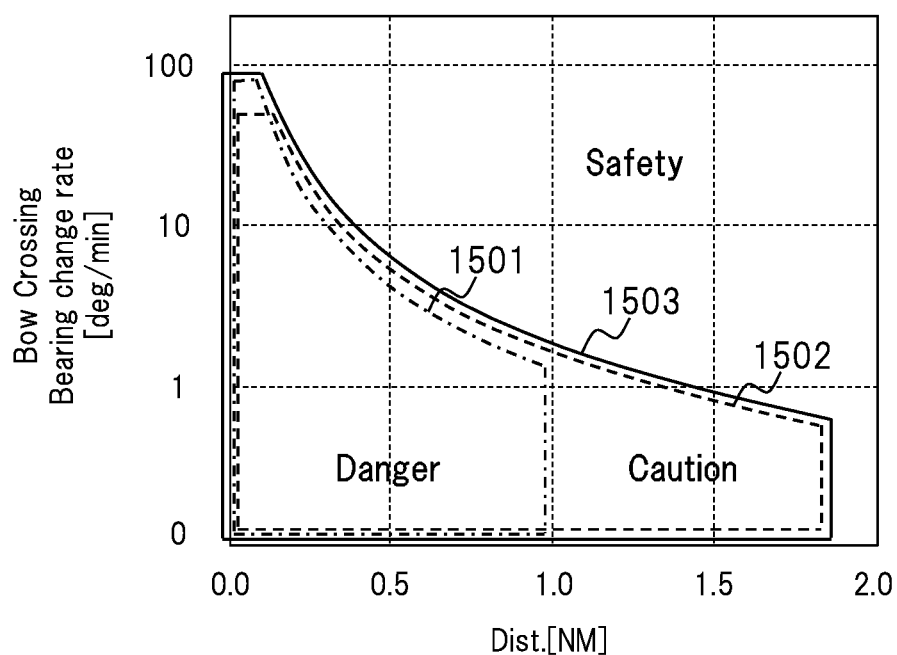
FIG. 15 is a diagram illustrating an example of a scoring method related to evaluation processing in the first embodiment.

FIG. 15 is an explanatory diagram for a scoring method related to the above-described scoring item "passing-by of other ships and obstacles". The graph in FIG. 15 corresponds to a situation in which the other ship crosses the own ship as illustrated in the examples of FIGS. 2 and 14 as the situation related to the collision in the sea area. In the graph of FIG. 15, the horizontal axis represents the "distance" Dist [NM] described above, and the vertical axis represents the "relative bearing change rate" (Bow Crossing Bearing change rate) [deg/min] described above. A region 1501 indicated by a dashed dotted line is the danger region, a region 1502 indicated by a broken line is the caution region, and the other region is the safety region. A region 1503 indicated by a solid line is a region ("collision danger region") including the danger region and the caution region, and is a region the point of which is deducted when the other ship intrudes the danger region or the caution region.

As supplementary explanation for the above-described scoring method, the collision between vessels occurs when the other ship approaches the own ship without bearing change of the other ship. Based on such a concept, the term "safe ship collision avoidance" is defined as a state in which the distance is maintained at a certain level or more while the bearing change is large. In this method, the evaluation value is increased in the case of "safe ship collision avoidance" (the safety region in the graph), while the evaluation value is decreased in the case of departing from "safe ship collision avoidance" (the region 1503 in the graph). The graph as illustrated in FIG. 15 is based on an aggregation of hearing results (in other words, feelings and experiences) from the actual ship operator. Such graph data is reflected to the program 3 and the evaluation processing. Thus, the automatic ship collision avoidance support by the computer using the model including the bumper has no problem even in terms of the feelings of the ship operator or others.

[Determination of Optimum Value]

Figure 16:
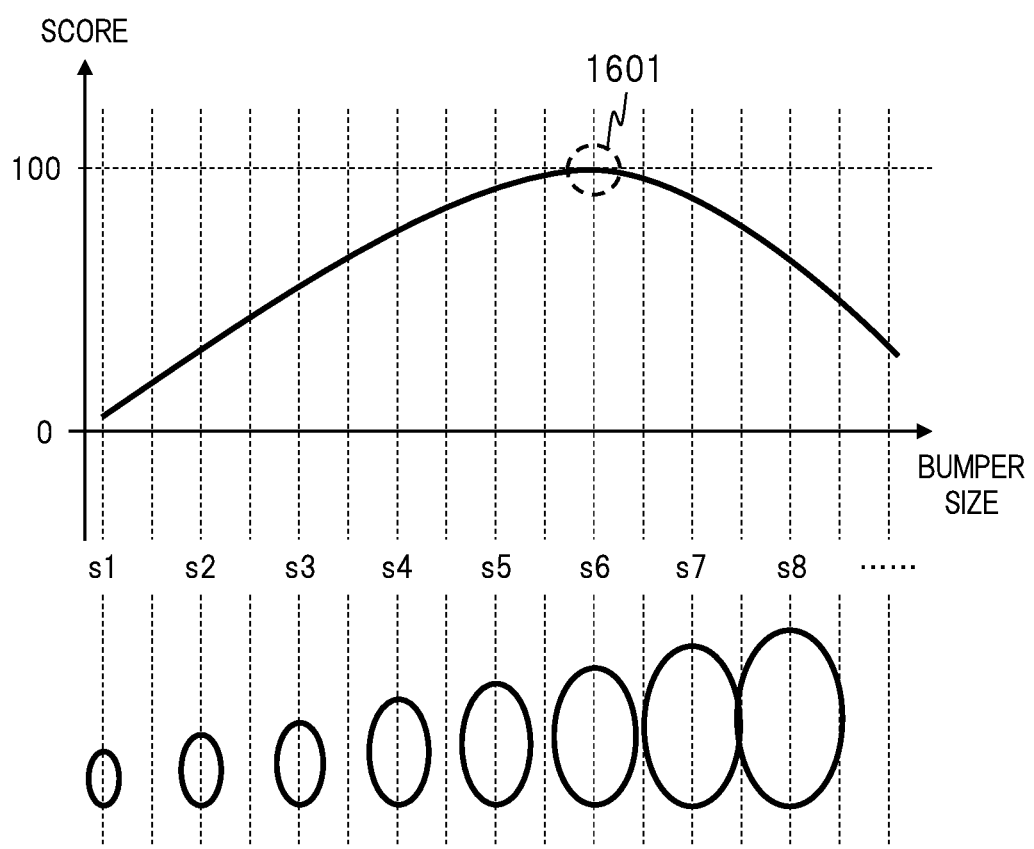
FIG. 16 is a diagram illustrating an example of determination of an optimum value of the exclusive region in the first embodiment.

FIG. 16 illustrates an example of a determination process (step S7 in FIG. 9) for the optimum value 106 of the bumper determined by the evaluation unit 12 of the ship maneuvering calculation device 1 in FIG. 1. The horizontal axis of the graph of FIG. 16 represents size parameter values (e.g., s1, s2, . . . ) of the bumper value, and images of the corresponding bumpers are illustrated on the lower side of the graph. The vertical axis is a score depending on the size, and indicates a value range from 0 to 100 in the graph. The score is, for example, a curve as illustrated in the drawing. For example, as illustrated as a bumper optimum point 1601, when the size is a value s6, the score is a maximum value (e.g., 100). Although the size is described in this example, the exclusive region value 104 can be similarly evaluated in combination with the shape and the deviation.

On the display screen of the ship maneuvering calculation device 1, the ship maneuvering calculation device 1 displays information including the shape, size, deviation, and others of the bumper at the exclusive region value 104, the evaluation value 105, and the optimum value 106 obtained by the simulation and the evaluation as illustrated in the example of FIG. 16. The user U1 can check the information on the display screen. In the display of the information of the optimum value 106, a display form as illustrated in FIG. 5 may be also applicable.

[Setting of Automatic Ship Collision Avoidance Program]

When the optimum value 106 of the bumper obtained by the above simulation is set to the program 3, not only the optimum value 106 of the bumper but also a set of the optimum value together with the condition 102 such as the scenario may be set. For example, the optimum values 106 of a plurality of bumpers such as a bumper value A in a situation A and a bumper value B in a situation B may be set as the bumper setting values 111 to the program 3. In this case, in the ship collision avoidance support following the program 3, the automatic ship collision avoidance device 2 applies the optimum value 106 of the bumper, which varies depending on the situation.

[Effects and Others]

As described above, according to the ship maneuvering calculation device 1 of the first embodiment, a suitable or optimum bumper setting value (optimum value 106 in FIG. 1) can be determined, and as a result, the accuracy of the ship collision avoidance support and the automatic ship maneuvering by the automatic ship collision avoidance device 2 and others can be improved. The safer and more economical ship collision avoidance maneuvering can be achieved by the automatic ship collision avoidance device 2 including the program 3.

Second Embodiment

A ship maneuvering calculation device according to a second embodiment of the present invention will be described with reference to FIG. 17. The calculation method (program or others) of the ship collision avoidance maneuvering using the bumper is not limited to the examples described in the first embodiment and the Patent Document 1. In the second embodiment, a case of application of a different method from the examples of the first embodiment and the Patent Document 1 is described. In the second embodiment, as the above method, a collision danger region (an area having a risk of collision) is first calculated using the bumper, and then, a route to the next destination (in other words, a given next way point) is searched to calculate a course toward an intermediate way point and a speed to reach the intermediate way point. The intermediate way point is, in other words, an intermediate destination, target value, or temporary way point, which is an intermediate target placed only to avoid the danger. This method is a method for heading to a destination by temporarily setting, when the collision risk is caused by linear navigation to the destination, single or a plurality of temporary way points for avoiding such collision.

Figure 17:
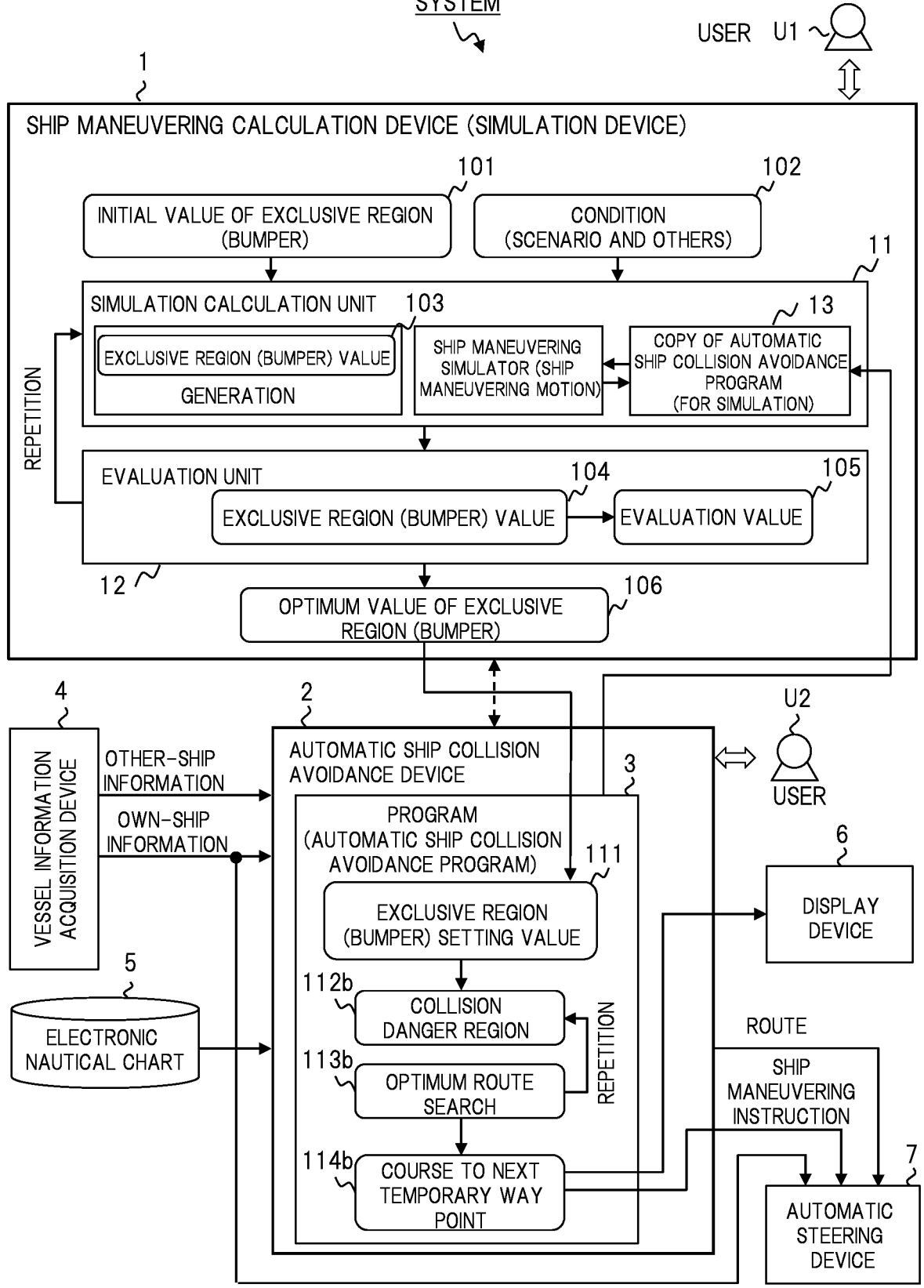
FIG. 17 is a diagram illustrating a configuration of an entire system including a ship maneuvering calculation device according to a second embodiment of the present invention.

FIG. 17 illustrates a configuration of an entire system including the ship maneuvering calculation device 1 according to the second embodiment. The configuration of FIG. 17 is different from the configuration of FIG. 1 in the contents of the automatic ship collision avoidance program 3 of the automatic ship collision avoidance device 2 to handle the difference in the method, and is correspondingly different in the contents of the simulation in the ship maneuvering calculation device 1. The contents of the automatic ship collision avoidance program 3 include the calculation of the collision danger region 112b using the bumper setting value 111, the calculation of the optimum route search 113b, and the calculation of the course 114b to the next temporary way point. The optimum route search 113b is a search for an optimum route avoiding the collision danger region 112b. The optimum route is, in other words, a route composed of temporary way points for ship collision avoidance. The calculations of the collision danger region 112b and the optimum route search 113b are repeated.

In the second embodiment, a calculation method using the bumper setting value 111 in the automatic ship collision avoidance program 3 will be described below. The preferability-based model described above (FIGS. 3 to 7) is a program that determines the course and speed by sequentially calculating the collision risk level 112, the preference level 113, and the utility value 114 if needed. On the other hand, in the second embodiment, the program 3 of the automatic ship collision avoidance device 2 performs the processing of the following steps S201 to S203 using the same logic.

In step S201, the automatic ship collision avoidance device 2 determines the collision danger region 112b using the bumper setting value 111. In step S202, the automatic ship collision avoidance device 2 searches for the optimum route (the temporary way point constituting the optimum route) avoiding the collision danger region 112b. In step S203, the automatic ship collision avoidance device 2 outputs the course and speed used for navigation to the next temporary way point.

More specifically, the following processing examples are exemplified. The automatic ship collision avoidance device 2 can obtain the optimum route (in other words, a row of the temporary way points) by repeating the sequential calculation of steps S201 to S203 by using the fast-time simulation. In step S201, the automatic ship collision avoidance device 2 determines the collision danger region 112b by using a logic for calculating the above-described collision risk level (Rx, Ry) using the position and course speed of the other ship having the greatest influence and the position and course speed of the own ship while using the given bumper setting value 111 as the parameter value.

In step S202, the automatic ship collision avoidance device 2 sets the next temporary way point so as to avoid the collision danger region 112b obtained in step S201 and to navigate to the next way point as much as possible. The next temporary way point in this setting may be, for example, a position moving to a course having the highest utility for a certain period of time (e.g., one minute) at the current speed. The automatic ship collision avoidance device 2 calculates the situation after passage of a certain period of time in the fast-time simulation, and moves the ship to the calculated point in the simulation. The other ships also move without the altering of the course speeds. The automatic ship collision avoidance device 2 records the moving location as the temporary way point. The automatic ship collision avoidance device 2 repeats the calculations of steps S201 and S202, and performs the calculations to reach the next way point. The row of the recorded temporary waypoints becomes a route to be followed (a course to the next temporary way point 114b).

As described above, according to the ship maneuvering calculation device 1 of the second embodiment, a suitable or optimum bumper setting value can be determined in accordance with the method of the automatic ship collision avoidance program 3 as similar to the first embodiment.

In the foregoing, the present invention has been concretely described on the basis of the embodiments. However, the present invention is not limited to the foregoing embodiments, and various modifications can be made within the scope of the present invention.

EXPLANATION OF REFERENCE CHARACTERS

1 . . . SHIP MANEUVERING CALCULATION DEVICE, 2 . . . SHIP COLLISION AVOIDANCE SUPPORT DEVICE, 3 . . . PROGRAM, 4 . . . VESSEL INFORMATION ACQUISITION DEVICE, 5 . . . ELECTRONIC NAUTICAL CHART, 6 . . . DISPLAY DEVICE, 7 . . . AUTOMATIC STEERING DEVICE, 11 . . . SIMULATION CALCULATION UNIT, 12 . . . EVALUATION UNIT, 101 . . . INITIAL VALUE OF EXCLUSIVE REGION (BUMPER), 102 . . . CONDITION, 103 . . . EXCLUSIVE REGION VALUE, 104 . . . EXCLUSIVE REGION VALUE, 105 . . . EVALUATION VALUE, 106 . . . OPTIMUM VALUE OF EXCLUSIVE REGION, 111 . . . EXCLUSIVE REGION SETTING VALUE, 112 . . . COLLISION RISK LEVEL, 113 . . . PREFERENCE LEVEL, 114 . . . UTILITY VALUE

It is claimed:

1. A ship maneuvering calculation device configured to calculate setting information of an automatic ship collision avoidance program for achieving a ship collision avoidance support function of a vessel,
    wherein a plurality of exclusive region values that are different in at least a shape and a size are generated as parameter values for an exclusive region set around a vessel,
    simulation calculation using the automatic ship collision avoidance program is repeatedly executed while changing the parameter values,
    an evaluation value corresponding to the parameter value is calculated based on a result of the simulation calculation,
    an optimum value of the exclusive region is determined based on the evaluation value, and
    an optimum value of the exclusive region is set to the automatic ship collision avoidance program.

2. The ship maneuvering calculation device according to claim 1,
    wherein a scenario including a situation related to a collision between an own ship and an other ship in a sea area is created as one of conditions of the simulation calculation, and
    the simulation calculation corresponding to the scenario is executed.

3. The ship maneuvering calculation device according to claim 1,
wherein a collision danger region is converted into a numerical value, based on a distance between an own ship and an other ship and a relative bearing change rate, and
the evaluation value is calculated based on the collision danger region.

4. The ship maneuvering calculation device according to claim 1,
wherein, at the time of the generation of the parameter values for the exclusive region, a plurality of values for a deviated position of the exclusive region with respect to a position of the vessel are generated.

5. The ship maneuvering calculation device according to claim 1,
wherein the automatic ship collision avoidance program calculates a collision risk level with respect to an other ship when an own ship performs ship collision avoidance maneuvering, by using a setting value of the exclusive region.

6. The ship maneuvering calculation device according to claim 5,
wherein the ship collision avoidance maneuvering program calculates a utility value by:
calculating the collision risk level with respect to an other ship having a greatest influence among single or a plurality of other ships for each position in a ship collision avoidance maneuvering space that is a space composed of combination of an option of a course altering angle and an option of a speed altering rate altered from a current state;
calculating a preference level representing a subjective preference of a ship operator for each position in the ship collision avoidance maneuvering space; and
subtracting the collision risk level from the preference level for each position in the ship collision avoidance maneuvering space.

7. The ship maneuvering calculation device according to claim 1,
wherein the automatic ship collision avoidance program determines a collision danger region, based on an exclusive region of an other ship, a course and a speed of an other ship, and a course and a speed of an own ship, by using a setting value of the exclusive region,
searches for an optimum route avoiding the collision danger region, based on a fast-time simulation, and
outputs a course and a speed corresponding to the optimum route.

8. The ship maneuvering calculation device according to claim 1,
wherein information including an optimum value of the exclusive region is displayed on a display screen.

9. The ship maneuvering calculation device according to claim 2,
wherein data having a condition including the scenario as an input and having an optimum value of the exclusive region as an output is learned using machine learning, and,
based on the learning, the optimum value of the exclusive region is output from the input corresponding to the condition including the scenario.

* * * * *